(12) United States Patent
Bisel

(10) Patent No.: US 8,428,986 B2
(45) Date of Patent: Apr. 23, 2013

(54) RETURN ON INVESTMENT ANALYSIS TOOL FOR STORAGE SYSTEMS

(75) Inventor: Steven W. Bisel, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/847,164

(22) Filed: Jul. 30, 2010

(65) Prior Publication Data

US 2012/0029975 A1 Feb. 2, 2012

(51) Int. Cl.
*G06Q 10/00* (2012.01)

(52) U.S. Cl.
USPC .......................................... 705/7.11; 705/7.38

(58) Field of Classification Search ................... 705/7.11, 705/7.38
See application file for complete search history.

(56) References Cited

U.S. PATENT DOCUMENTS

| 7,698,402 | B2 * | 4/2010 | Santos et al. ................. 709/223 |
| 8,103,824 | B2 * | 1/2012 | Pollack et al. ................ 711/114 |
| 2009/0276771 | A1 * | 11/2009 | Nickolov et al. ............. 717/177 |

OTHER PUBLICATIONS

Seung-Hwan Lim, et al. "MDCSim: A Multi-tier Data Center Simulation Platform", IEEE International Conference on Cluster Computing and Workshops, 2009.*
Seung-Hwan Lim et al., "MDCSim: A Multi-tier Data Center Simulation Platform", IEEE International Conference on Cluster Computing and Workshops, 2009, pp. 1-10.

* cited by examiner

*Primary Examiner* — Mark A Fleischer
(74) *Attorney, Agent, or Firm* — Kunzler Law Group, PC

(57) ABSTRACT

An apparatus, system, and method are disclosed for modeling and projecting future storage requirements and analyzing the associated storage system costs including storage system costs associated with multi-tier storage systems. Storage environment data corresponding to a first storage environment is received, where the first storage environment data includes one or more variables associated with a cost of the first storage environment. Target storage environment data corresponding to a target storage environment is also received. Target storage environment data includes one or more variables associated with a cost of the target storage environment. A cost associated with the first storage environment based on the received first storage environment data and a cost associated with the target storage environment is determined based on the received target storage environment data. The determined cost of the first storage environment is compared to the determined cost of the target storage environment. The results are displayed.

18 Claims, 26 Drawing Sheets

New Environment Improvements Section

1800 →

☑ Toggle All ILM % Improvements Off/On   ☑ Toggle Util % Improvements Off/On   ☑ Toggle Data Ra[te]

☐ Toggle Tier Disk Movements (Tiers 1, 2 or 3) Off/On   ☑ Toggle Archiving (Movement to Tiers 4 & 5) Off/On

1802

| Utilization Improvements | Year 1 | Year 2 | Year 3 | Year 4 | Year 5 | Year 6 | Year 7 |
|---|---|---|---|---|---|---|---|
| Stg Utilization Improvement Tier 1 | 50% | 60% | 70% | 75% | 75% | 75% | 75% |
| Stg Utilization Improvement Tier 2 | 50% | 60% | 70% | 75% | 75% | 75% | 75% |
| Stg Utilization Improvement Tier 3 | 50% | 60% | 70% | 75% | 75% | 75% | 75% |
| Util Improvement on Tier 1 | 5% | 10% | 10% | 5% | | | |
| Util Improvement on Tier 2 | 5% | 10% | 10% | 5% | | | |
| Util Improvement on Tier 3 | 5% | 10% | 10% | 5% | | | |

*Do not edit these cells. Percentages are summed and used in calcuations for total stg recovery*

| New Environment Recovery Summarization | Year 1 | Year 2 | Year 3 | Year 4 | Year 5 | Year 6 | Year 7 |
|---|---|---|---|---|---|---|---|
| Total % of ALL space recovery improvements T1 | 5% | 5% | 5% | 5% | 5% | 5% | 5% |
| Total % of ALL space recovery improvements T2 | 5% | 5% | 5% | 5% | 5% | 5% | 5% |
| Total % of ALL space recovery improvements T3 | 5% | 5% | 5% | 5% | 5% | 5% | 5% |

Business As Usual Costs Summary

Current Capacities

| | Item | 1 Yr | 2 Yrs | 3 Yrs | 4 Yrs | 5 Yrs | 6 Yrs | 7 Yrs |
|---|---|---|---|---|---|---|---|---|
| | Tier 1 | 90 | | | | | | |
| | Tier 2 | 135 | | | | | | |
| | Tier 3 | 180 | | | | | | |
| 2104 | Net New Storage All Tiers | 101 | 127 | 158 | 198 | 247 | 309 | 386 |
| 2106 | Actual New Storage All Tiers | 203 | 228 | 259 | 299 | 450 | 537 | 646 |
| 2108 | Total cost of new on-line disk storage ($K) | $ 2,125 K | $ 2,032 K | $ 1,967 K | $ 1,927 K | $ 2,463 K | $ 2,499 K | $ 2,555 K |
| | Total cost of new on-line disk storage ($M) | $ 2.1 M | $ 2.0 M | $ 2.0 M | $ 1.9 M | $ 2.5 M | $ 2.5 M | $ 2.6 M |
| 2110 | Start of Year Stg Tier 1 (TB) | 90 | 113 | 141 | 176 | 220 | 275 | 343 |
| | Start of Year Stg Tier 1 (TB) | 135 | 169 | 211 | 264 | 330 | 412 | 515 |
| | Start of Year Stg Tier 1 (TB) | 180 | 225 | 281 | 352 | 439 | 549 | 687 |
| 2112 | Total Start of Year Stg | 405 | 506 | 633 | 791 | 989 | 1236 | 1545 |
| 2114 | EOY Stg Tier 1 (TB) | 113 | 141 | 176 | 220 | 275 | 343 | 429 |
| | EOY Stg Tier 2 (TB) | 169 | 211 | 264 | 330 | 412 | 515 | 644 |
| | EOY Stg Tier 3 (TB) | 225 | 281 | 352 | 439 | 549 | 687 | 858 |
| 2116 | Total Tech Ref Stg Removed All Tiers | (101) | (101) | (101) | (101) | (203) | (228) | (259) |
| | Total New Remote / Flash Copy Stg All Tiers (TB) | 0 | 0 | 0 | 0 | 0 | 0 | 0 |
| | Cumulative Remote/Flash Copy Stg All Tiers (TB) | 0 | 0 | 0 | 0 | 0 | 0 | 0 |
| | Net Total EOY Stg All Tiers (excludes rem copy) | 506 | 633 | 791 | 989 | 1236 | 1545 | 1931 |
| | Cumulative Cost of All New Storage (Thousands) | $ 3,264 K | $ 6,506 K | $ 9,759 K | $ 13,053 K | $ 16,968 K | $ 21,009 K | $ 25,204 K |
| 2118 | Cumulative Cost of All New Storage (Millions) | $ 3.3 M | $ 6.5 M | $ 9.8 M | $ 13.1 M | $ 17.0 M | $ 21.0 M | $ 25.2 M |

FIG. 21

New Environment Costs Summary

| Item | 1 Yr | 2 Yrs | 3 Yrs | 4 Yrs | 5 Yrs | 6 Yrs | 7 Yrs |
|---|---|---|---|---|---|---|---|
| 2204 — Net New Storage All Tiers | 5 | 0 | 0 | 19 | 49 | 55 | 62 |
| 2206 — Actual New Storage All Tiers | 106 | 76 | 88 | 120 | 155 | 130 | 149 |
| 2208 — Total cost of new on-line disk storage ($K) | $1,170 K | $720 K | $637 K | $745 K | $852 K | $606 K | $551 K |
| Total cost of new on-line disk storage ($M) | $1.2 M | $0.7 M | $0.6 M | $0.7 M | $0.9 M | $0.6 M | $0.6 M |
| 2210 — Start of Year Stg Tier 1 (TB) | 90 | 97 | 96 | 90 | 90 | 97 | 104 |
| Start of Year Stg Tier 1 (TB) | 135 | 137 | 128 | 123 | 128 | 143 | 159 |
| Start of Year Stg Tier 1 (TB) | 180 | 177 | 160 | 158 | 171 | 199 | 230 |
| 2212 — Total Start of Year Stg | 405 | 410 | 384 | 371 | 389 | 438 | 493 |
| 2214 — EOY Stg Tier 1 (TB) | 97 | 96 | 90 | 90 | 97 | 104 | 112 |
| EOY Stg Tier 2 (TB) | 137 | 128 | 123 | 128 | 143 | 159 | 177 |
| EOY Stg Tier 3 (TB) | 177 | 160 | 158 | 171 | 199 | 230 | 265 |
| 2216 — Total Tech Ref Stg Removed All Tiers | (101) | (101) | (101) | (101) | (106) | (76) | (88) |
| Total New Remote / Flash Copy Stg All Tiers (TB) | 0 | 0 | 0 | 0 | 0 | 0 | 0 |
| Cumulative Remote/Flash Copy Stg All Tiers (TB) | 0 | 0 | 0 | 0 | 0 | 0 | 0 |
| Net Total EOY Stg All Tiers (excludes rem copy) | 410 | 384 | 371 | 389 | 438 | 493 | 554 |
| Cumulative Cost of All New Storage | $2,252 K | $4,006 K | $5,633 K | $7,324 K | $9,081 K | $10,552 K | $11,930 K |
| 2218 — Cumulative Cost of All New Storage (Millions) | $2.3 M | $4.0 M | $5.6 M | $7.3 M | $9.1 M | $10.6 M | $11.9 M |

| BAU | 1 Yr | 2 yrs | 3 yrs | 4 yrs | 5 yrs | 6 yrs | 7 yrs |
|---|---|---|---|---|---|---|---|
| Total Cost of New Disk Storage | $ 2,125.0 | $ 2,032.0 | $ 1,967.1 | $ 1,926.9 | $ 2,463.3 | $ 2,499.4 | $ 2,555.5 |
| Total Cost of New Tape Storage | $ 1,139.1 | $ 1,210.3 | $ 1,285.9 | $ 1,366.3 | $ 1,451.7 | $ 1,542.4 | $ 1,638.8 |
| New SVC License Cost | $ 0.0 | $ 0.0 | $ 0.0 | $ 0.0 | $ 0.0 | $ 0.0 | $ 0.0 |
| New SVC Maint Cost | $ 0.0 | $ 0.0 | $ 0.0 | $ 0.0 | $ 0.0 | $ 0.0 | $ 0.0 |
| New TSPC License Cost | $ 0.0 | $ 0.0 | $ 0.0 | $ 0.0 | $ 0.0 | $ 0.0 | $ 0.0 |
| New TSPC Main Cost | $ 0.0 | $ 0.0 | $ 0.0 | $ 0.0 | $ 0.0 | $ 0.0 | $ 0.0 |
| Other New Costs | $ 0.0 | $ 0.0 | $ 0.0 | $ 0.0 | $ 0.0 | $ 0.0 | $ 0.0 |
| New Disk Stg Maint Costs | $ 159.4 | $ 159.4 | $ 159.4 | $ 318.8 | $ 304.8 | $ 295.1 | $ 289.0 |
| New SVC HW Cost | $ 0.0 | $ 0.0 | $ 0.0 | $ 0.0 | $ 0.0 | $ 0.0 | $ 0.0 |
| New SVC HW Maint Cost | $ 0.0 | $ 0.0 | $ 0.0 | $ 0.0 | $ 0.0 | $ 0.0 | $ 0.0 |
| Data Migration Costs | $ 0.0 | $ 0.0 | $ 0.0 | $ 0.0 | $ 0.0 | $ 0.0 | $ 0.0 |
| New GMAS Costs | $ 0.0 | $ 0.0 | $ 0.0 | $ 0.0 | $ 0.0 | $ 0.0 | $ 0.0 |
| Annual Power Costs | $ 0.0 | $ 110.2 | $ 97.5 | $ 82.8 | $ 62.1 | $ 63.2 | $ 60.2 |
| Annual Facilities Costs | $ 0.0 | $ 64.8 | $ 56.2 | $ 46.7 | $ 32.4 | $ 33.7 | $ 30.7 |
| New Staffing Costs | $ 0.0 | $ 0.0 | $ 0.0 | $ 0.0 | $ 0.0 | $ 0.0 | $ 0.0 |
| Total All Costs | $ 3,423.4 | $ 3,576.7 | $ 3,566.1 | $ 3,741.5 | $ 4,314.3 | $ 4,433.8 | $ 4,574.2 |
| BAU Net Annual Capacity | 506 TB | 633 TB | 791 TB | 989 TB | 1,236 TB | 1,545 TB | 1,931 TB |
| BAU Net Annual Data | 228 TB | 285 TB | 356 TB | 445 TB | 556 TB | 695 TB | 869 TB |
| BAU Cost / TB Data | $ 15.0 | $ 12.6 | $ 10.0 | $ 8.4 | $ 7.8 | $ 6.4 | $ 5.3 |
| BAU Cost / TB Capacity | $ 6.8 | $ 5.7 | $ 4.5 | $ 3.8 | $ 3.5 | $ 2.9 | $ 2.4 |

| Financial Metrics | |
|---|---|
| Analysis Period | 7 Years |
| Internal Discount Rate | 10.0% |
| Return on Investment (ROI) | 74% |
| Net Present Value (NPV) Cash Flow | $ 2,785 K |
| Internal Rate of Return (IRR) | 40% |
| Modified Internal Rate of Return (MIRR) | 27% |
| Benefit to Cost Ratio (BCR) | 1.7 |
| Approximate Break-even Point | 35 months |

| Net Costs Summary | |
|---|---|
| SVC SW License | $ 892 K |
| SVC SW Maintenance | $ 904 K |
| TPC License | $ 1,777 K |
| TPC Maintenance | $ 1,699 K |
| SVC HW Hardware | $ 309 K |
| SVC HW Maintenance | $ 131 K |
| Internal Implentation Costs | $ 150 K |
| SVC Implementation Services | $ 275 K |
| Education | $ 140 K |
| SRM Implementation | $ 325 K |
| Total Costs | $ 6,601 K |

| Net Benefits Summary | |
|---|---|
| Disk Storage (Transactional) | $ 10,289 K |
| Tape Storage (Transactional) | $ 2,984 K |
| Disk Storage Maintenance (Transactional) | $ 439 K |
| Power / Cooling | $ 188 K |
| Facilities Occupancy | $ 84 K |
| Total Benefits | $ 13,984 K |
| Net Benefits *(Total Benefits - Total Costs)* | $ 7,383 K |

FIG. 26

RETURN ON INVESTMENT ANALYSIS TOOL FOR STORAGE SYSTEMS

FIELD

The subject matter disclosed herein relates to cost analysis tools and more particularly relates to return on investment tools and cost analysis tools as related to storage systems and storage environments.

BACKGROUND

Description of the Related Art

As technology advances, data storage systems are becoming increasingly complex. The complexity of modern storage environments makes it difficult to analyze and compare the cost of different potential storage infrastructures. The lack of available tools for analyzing variable costs of complex storage systems makes it difficult for businesses to plan for and make decisions regarding storage systems and storage system growth.

Enterprise storage growth can be managed and contained at lower costs if effective processes and tools are utilized to obtain more effective utilization of storage resources. There are several cost elements associated with managing storage that are not accounted for by current cost analysis tools such as hardware and software costs, staffing costs, power consumption costs, and implementation costs such as education and servicing costs. Further, current storage cost analysis tools are unable to properly analyze the cost of multi-tiered storage environments and other complex storage systems.

BRIEF SUMMARY

From the foregoing discussion, it should be apparent that a need exists for an apparatus, system, and method that can model and project future storage requirements and analyze the true cost of complex storage systems. Beneficially, such an apparatus, system, and method would enable the input of variable data that affects a storage environment, including multiple tiers of storage and other variables such as human resource costs, so that the cost of the storage environment can be accurately determined and planned for.

The present invention has been developed in response to the present state of the art, and in particular, in response to the problems and needs in the art that have not yet been fully solved by currently available analysis tools. Accordingly, the present invention has been developed to provide an apparatus, system, and method for analyzing complex storage system costs that overcome many or all of the above-discussed shortcomings in the art.

The apparatus to project future storage requirements and analyze the associated storage environment costs is provided with a plurality of modules configured to functionally execute the necessary steps of analyzing storage costs for a first storage environment and a target storage environment. These modules in the described embodiments include a first input module, a second input module, a cost module, a comparison module, and a display module.

The first input module, in one embodiment, receives as input first storage environment data corresponding to a first storage environment, the first storage environment data comprising one or more variables associated with a cost of the first storage environment. The second input module, in one embodiment, receives as input target storage environment data corresponding to a target storage environment, the target storage environment data comprising one or more variables associated with a cost of the target storage environment.

The cost module, in one embodiment, determines a cost associated with the first storage environment based on the received first storage environment data and that determines a cost associated with the target storage environment based on the received target storage environment data. The comparison module, in one embodiment, compares the determined cost of the first storage environment to the determined cost of the target storage environment. The display module, in one embodiment, displays results of the compared costs.

A system of the present invention is also presented to analyze storage environment costs. The system may be embodied to substantially include the modules and functionality described above with regard to the apparatus. In particular, the system, in one embodiment, includes a first storage environment comprising one or more storage devices and includes a storage environment analysis tool. The storage environment analysis tool substantially includes, in one embodiment, the first input module, second input module, cost module, comparison module, and display module as described above with regard to the apparatus.

A computer program product of the present invention is also presented for analyzing storage environment costs. The computer program product substantially includes the modules and functionality described above with regard to the apparatus and system. The computer program product, in one embodiment, includes a computer readable storage medium having computer readable program code executing to perform operations for analyzing storage environment costs. The operations, in one embodiment, include receiving as input first storage environment data corresponding to a first storage environment, where the first storage environment data includes one or more variables associated with a cost of the first storage environment and receiving as input target storage environment data corresponding to a target storage environment, where the target storage environment data includes one or more variables associated with a cost of the target storage environment.

The operations may also include determining a cost associated with the first storage environment based on the received first storage environment data and determining a cost associated with the target storage environment based on the received target storage environment data and comparing the determined cost of the first storage environment to the determined cost of the target storage environment. In one embodiment, the operations also include displaying results of the compared costs.

The method in the disclosed embodiments substantially includes the steps necessary to carry out the functions presented above with respect to the operation of the described apparatus and system. In one embodiment, the method includes entering storage data information into a storage environment analysis tool, where the storage environment analysis tool includes the first input module, second module, cost module, comparison module, and display module described above with regard to the apparatus and system.

The first input module, in one embodiment, receives as input first storage environment data corresponding to a first storage environment, the first storage environment data comprising one or more variables associated with a cost of the first storage environment. The second input module, in one embodiment, receives as input target storage environment data corresponding to a target storage environment, the target storage environment data comprising one or more variables associated with a cost of the target storage environment. In one embodiment, the first storage environment and the target storage environment are multi-tier storage environments, and the first storage environment data and target storage environment data include one or more variables associated with a cost of implementing a multi-tier storage environment;

The cost module, in one embodiment, determines a cost associated with the first storage environment based on the received first storage environment data and that determines a cost associated with the target storage environment based on the received target storage environment data. The comparison module, in one embodiment, compares the determined cost of the first storage environment to the determined cost of the target storage environment. The display module, in one embodiment, displays results of the compared costs.

In a further embodiment, the method includes applying the displayed results of the compared costs to a business plan and presenting the business plan to a client.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 14 is a screenshot of one embodiment of a data input form for a storage environment analysis tool in accordance with the present invention;

FIG. 18 is a screenshot of one embodiment of a data input form for a storage environment analysis tool in accordance with the present invention;

FIG. 21 is a screenshot of one embodiment of a cost summary table for a first storage environment in accordance with the present invention;

FIG. 22 is a screenshot of one embodiment of a cost summary table for a target storage environment in accordance with the present invention;

FIG. 24 is a screenshot of one embodiment of a cost analysis table for a first storage environment in accordance with the present invention;

FIG. 26 is a screenshot of one embodiment of a cost/benefit summary table for a target storage environment in accordance with the present invention.

DETAILED DESCRIPTION

Figure 1:
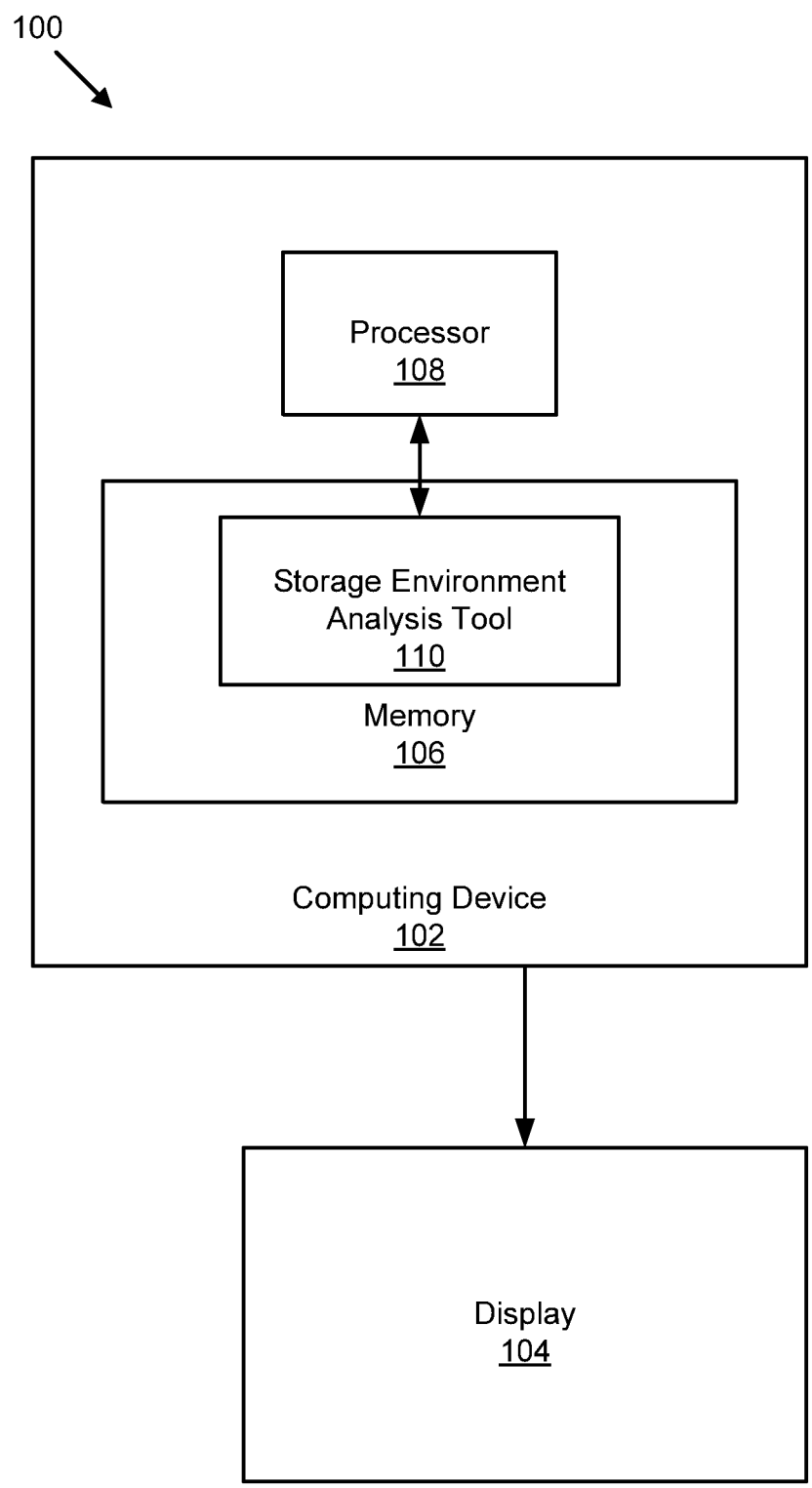
FIG. 1 is a schematic block diagram illustrating one embodiment of a system for analyzing storage environment costs in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for analyzing storage environment costs in accordance with the present invention. The system, in the depicted embodiment includes a computing device 102, a display 104, a memory 106, a processor 108, and a storage environment analysis tool 110.

The computing device 102, in one embodiment, is an electronic device such as a personal computer, a laptop, a personal digital assistant, a cell phone, a server, a mainframe computer, or the like. The computing device 102 in various embodiments is configured to execute the storage environment analysis tool 110 to analyze, determine, and compare the cost of various storage environments and target storage environments. In one embodiment, the computing device 102 may include a memory 106 and a processor 108, and the memory 106 and the processor 108 are utilized to execute the logic associated with the storage environment analysis tool.

The memory 106 may be configured as system memory of the computing device 102 such as random access memory ("RAM") or may be implemented as other types of memory such a hard-disk drive, flash memory, tape drive memory, or other forms of memory recognized by those of skill in the art. The processor 108 may be configured as microprocessor for processing computer instructions and the like as will be recognized by one of ordinary skill in the art.

In one embodiment, the storage environment analysis tool 110 may be implemented using logic devices such as VLSI circuits or gate arrays, off-the-shelf semiconductors such as logic chips, transistors, or other discrete components. In further embodiments, the storage environment analysis tool 110 may be implemented using a combination of operations stored in a memory 106 and/or other logic devices.

The storage environment analysis tool 110 operates, in one embodiment, to cause the computing device 102 to depict elements of the storage environment analysis tool 110 on the display 104. The display may be configured as a computer monitor, projector, touch pad, or other types of displays recognized by those of skill in the art. The storage environment analysis tool 110 may also receive inputs from an input device (not shown) such as a keyboard, mouse, touchpad, or the like.

The storage environment analysis tool 110, in one embodiment, is configured to analyze and compare a first storage environment to a new potential or target storage environment to determine a cost advantage of changing from the first storage environment to the target storage environment. The storage environment analysis tool 110, as described in detail below, is configured to receive input variable data that affects the cost of a storage environment, including storage environments with multiple tiers of storage and other variables and cost considerations not currently available in conventional storage environment analysis tools. In one embodiment, the storage environment analysis tool 110 provides a "what-if" analysis to compare two or more alternative storage environments, including multi-tier storage environments, and provides side-by-side comparisons of costs and benefits. The storage environment analysis tool 110 allows a user to demonstrate, for example to a potential purchaser of a new storage environment, which course of action and changes to a storage environment will provide the most benefit and minimum cost over time.

Figure 2:
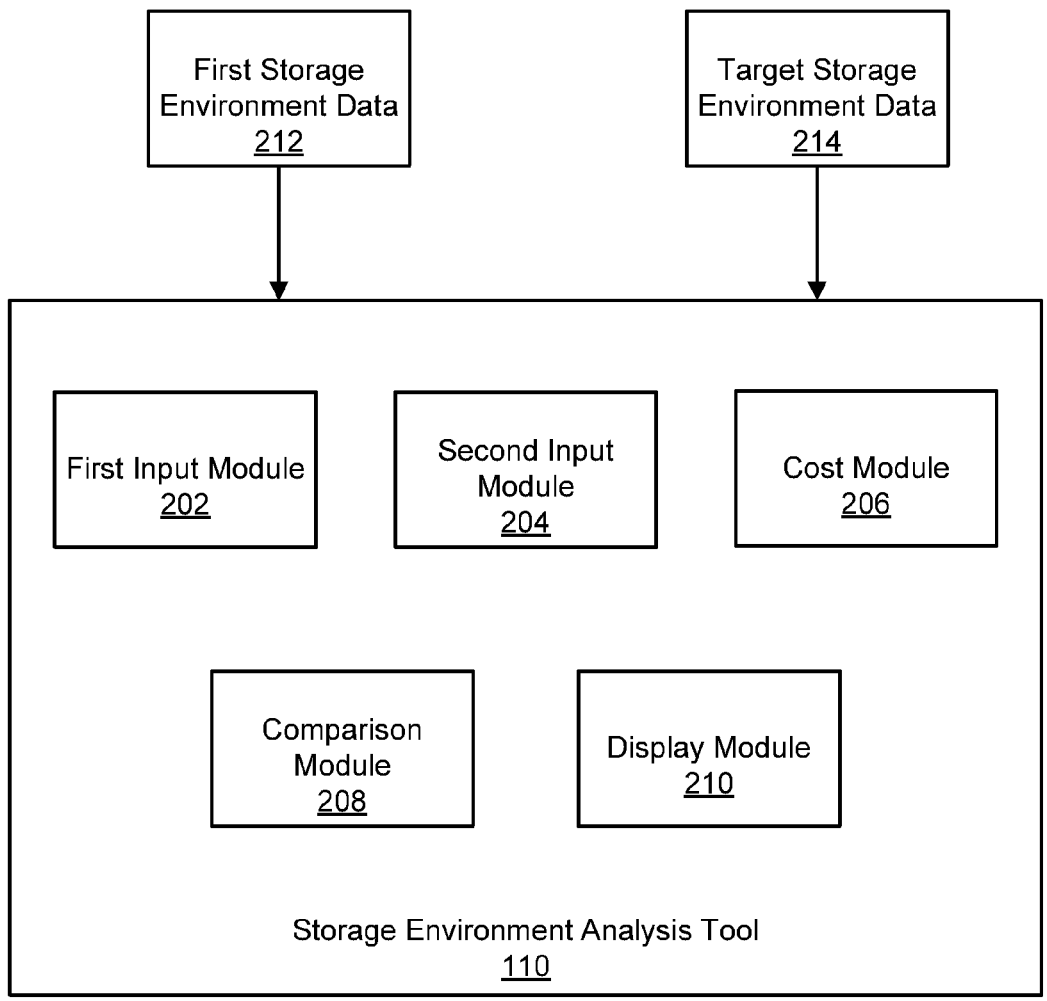
FIG. 2 is a schematic block diagram illustrating one embodiment of a storage environment analysis tool for analyzing storage environment costs in accordance with the present invention.

FIG. 2 is a schematic block diagram illustrating one embodiment of a storage environment analysis tool 110 for analyzing storage environment costs in accordance with the present invention. In the depicted embodiment, the storage environment analysis tool 110 includes a first input module 202, a second input module 204, a cost module 206, a comparison module 208, and a display module 210.

In one embodiment, the first input module 202 is configured to receive as input first storage environment data 212 corresponding to a first storage environment. The first storage environment data 212 may include one or more variables associated with a cost of the first storage environment. In one embodiment, the first storage environment may be a currently implemented storage environment or a business-as-usual ("BAU") storage environment that reflects the environment as previously and/or currently maintained and operated. In a further embodiment, the first storage environment may be a multi-tier storage environment that utilizes multiple tiers of storage.

A multi-tier storage environment is a storage environment that uses different tiers of storage by assigning different categories of data to different types of storage media to reduce total storage costs and improve storage efficiency. (See FIG. 5 and discussion of FIG. 5 below). For example, categories may be based on different levels of protection needed, performance requirements, frequency of use, and other considerations. In common configurations a plurality of tiers are used such as Tier 1, Tier 2, Tier 3, etc. As an example, Tier 1 data typically includes mission-critical data, recently accessed data, or highly secure data and may be stored on expensive high-quality and highly reliable media such as double-parity RAIDs. Tier 2 data may include less critical data or less frequently accessed data and is typically stored on less expensive media such as less expensive or slower hard-disk drives. As the Tier number increases, typically the cost, reliability, and speed of the storage is reduced. In some instances, an environment may have multiple-disk storage tiers and multiple tape storage tiers. In other instances, disk storage and tape storage (as well as other types of storage) may be combined to form a tiered environment. In one embodiment, for example, Tier 3 may be comprised of tape storage, whereas Tiers 1 and 2 may be comprised of disk storage.

Examples of storage environment data 212 and 214 may include variables associated with a storage environment cost such as a total amount of storage for each of a plurality of storage tiers, a utilization amount or percentage of utilization of storage devices, an anticipated amount of data growth over time, a current staffing level or labor cost required to administer the environment, and other variable costs such as education, services, miscellaneous hardware and software costs, power costs, and footprint costs, as well as other variables that may affect the cost of a storage environment. In some instances, default values may be used for one or more storage environment data variables.

In one embodiment the first input module 202 receives the storage environment data from a user by way of an input device. In some instances, the first input module 202 may determine storage environment data automatically, for example, by accessing a current storage environment to determine an amount of storage and percentage of utilization of each storage device in the storage environment. In one embodiment, a user may be prompted via the display 104 to input data. In another embodiment, a form may be displayed with entry lines, boxes, or spaces for the user to input data. For example, a spreadsheet tool or table may be used to input the storage environment data. In another embodiment, indicators may be used to indicate required data inputs versus optional data inputs, to indicate invalid input data, to indicate an operation to be performed on the data (e.g. a function or calculation), or the like. An indicator, in one embodiment, may be displayed as a different color, a shaded area, or of type of indicator as recognized by one of skill in the art.

In one embodiment, the first storage environment data 212 may include identification information about the owner of the first storage environment. Such data may include items such as a company name, address, telephone number, etc. In one embodiment, this data may be used to associate the results or output of the storage environment analysis tool 110 with a customer or client.

In one embodiment, the first storage environment data 212 may include one or more variables associated with a cost of implementing a multi-tier storage environment. For example, variables associated with a cost of implementing a multi-tier storage environment might include an amount of storage per tier, the type of storage in each tier, an amount of storage utilization per tier, and the like. In a further embodiment, the first storage environment data 212 may include one or more storage-per-tier variables that define a total amount of storage per tier of the first storage environment. In another embodiment, the storage-per-tier variables may define an amount of storage per tier per year for a particular time period. In yet a further embodiment, the first storage environment data 212 may include one or more utilization variables that define an amount of utilization of storage for each tier of the first storage environment or an amount of storage for each tier per year of a specified time period. For example, one storage environment might have three tiers with 20 terabytes in Tier 1, 30 terabytes in Tier 2, and 30 terabytes in Tier 3. A cost per terabyte for the type of storage in each tier may also be specified as well as a utilization percentage (e.g. 20% of the storage for Tier 1 is being used).

In one embodiment, the first storage environment data 212 may include one or more data growth variables that define an anticipated amount of data growth over time. Data growth over time refers to the amount data that is anticipated to be stored in the storage environment for the predicted time period. For example, the data might include a predicted amount of growth for each year in a five or ten year period. In some instances, the growth rate may change each year. In the first year a growth rate of 20% might be expected, but in the second year a growth rate of 50% might be expected. In other embodiments, a constant growth rate may be anticipated for each year. The anticipated growth rate may be used in determining a cost associated with the storage environment. For example, new storage devices, software, or additional labor may be needed to handle the growth. In one embodiment, the data growth variables may include data from previous years or time periods, and that data may be used to automatically predict a future data growth for the storage environment.

In a further embodiment, the first storage environment data 212 may include one or more staffing variables that define a labor cost associated with implementing the first storage environment. Examples of labor costs may include IT personnel, maintenance personnel, installation costs, etc. associated with implementing and operating a storage environment. The staffing variables may also include a prediction element that anticipates a cost of staffing for a particular time period. For example, the staffing variables may specify the cost of labor for each year of the next five or ten years.

In one embodiment, the first storage environment data 212 may include one or more footprint variables that define a cost associated with storing or housing the components of the first storage environment. For example, the storage devices associated with the storage environment such as network components, computers, servers, disk storage devices, tape storage device, etc. each typically take up space in an office or storage room. The footprint variables define a cost associated with use of the space such as a rental cost per square foot or the like.

Again the footprint variables may include a predictive element such as per year footprint costs for future years or other predetermined periods of time.

In another embodiment, the first storage environment data 212 may include one or more power variables that define an amount of power consumed by the first storage environment. The amount of power may vary based on the types of devices used and the size of the environment. Storage devices associated with different tiers of storage may require different amounts of power for operation. Again the power variables may include a predictive element such as per year power cost for future years or other predetermined periods of time. The power variable may include a cost of power associated with, for example, a local power company or a national average cost per kilowatt-hour.

In addition to these specific storage environment variables, other input variables are also contemplated. For example, client specific limitations such as a maximum footprint, maximum power consumption, or the like may be specified that reflect a maximum amount of storage growth or cost that may be realized. Additionally, variable costs such as educating staff members, consultant services, or other costs may be used. Information about the storage environment may also be used such as a number of storage area networks ("SANs") in the environment, the types of servers and number of servers, the number of storage tiers currently utilized, the definitions of current storage tiers, the technology refresh schedule (how often are system components updated or replaced), etc. In further embodiments, the storage environment data may include information about specific storage environment tools such as storage virtualization, for example IBM SAN Volume Controller (SVC) and storage resource management tools, for example Tivoli Storage Productivity Center ("TSPC"). In some embodiments, the input data may be selected from a list of possibilities such as from a drop down list or the like.

The SVC enables virtualization of the storage, for example, to appear as a single storage device. In some embodiments, this makes easier the movement of data from one tier to another tier so that data is assigned to a correct tier or a tier that has the performance and reliability needed for the respective data. TSPC identifies unused data that can be deleted so that storage can be reclaimed. The use of SVC or TSPC affects the cost and efficiency of a storage system by reclaiming storage or increasing storage utilization for existing storage devices.

The second input module 204, in one embodiment, receives as input target storage environment data 214 corresponding to a target storage environment. The target storage environment data 214 may include one or more variables associated with a cost of the target storage environment. A target storage environment is a storage environment typically presented as an alternative or improvement to the first or current storage environment. The target storage environment data 214 may include variables such as estimated improvement of utilization (as compared to the first storage environment), estimated movement and reclamation of storage data through improved management or storage protocols, component costs associated with the target storage environment, other variable elements such as services costs, facilities costs, education costs, implementation costs, migrations costs, power costs, footprint costs, staffing costs, and other variables as recognized by one of skill in the art.

In one embodiment the second input module 204 receives the storage environment data from a user by way of an input device in a similar manner to that of the first input module 202. In some instances, the second input module 204 may determine storage environment data automatically, for example, by accessing a current storage environment to determine an amount of storage and percentage of utilization of each storage device in a target storage environment. In one embodiment, a user may be prompted via the display 104 to input data. In another embodiment, a form may be displayed with entry lines, boxes, or spaces for the user to input data. For example, a spreadsheet tool or table may be used to input the storage environment data. In one embodiment, indicators may be used to indicate required data inputs versus optional data inputs, to indicate invalid input data, to indicate an operation to be performed on the data (e.g. a function or calculation), or the like. An indicator may be displayed as a different color, a shaded area, or of type of indicator as recognized by one of skill in the art. Although the first input module 202 and second input module 204 are shown separately, in some embodiments, the first and second input modules 202, 204 may integrated together or presented as a single data entry module such as by using a single form or table for the data entry.

In one embodiment, the target storage environment data 214 may include one or more variables associated with a cost of implementing a multi-tier storage environment. For example, variables associated with a cost of implementing a multi-tier storage environment might include an amount of storage per tier, the type of storage in each tier, an amount of storage utilization per tier, a cost of storage per tier per storage unit (e.g. cost per terabyte), and the like. In one embodiment, the target storage environment data 214 may include one or more storage-per-tier variables that define a total amount of storage per tier of the first storage environment. In a further embodiment, the storage-per-tier variables may define an amount of storage per tier per year for a particular time period such as five or ten years. In yet a further embodiment, the target environment data 214 may include one or more utilization variables that define an amount of utilization of storage for each tier of the first storage environment or an amount of storage for each tier per year of a specified time period.

In one embodiment, the target storage environment data 214 may include one or more target utilization variables that define an estimated target storage utilization for the target storage environment. Utilization of storage may differ in a target environment from the first storage environment based on factors such as the total amount of storage, the number of tiers used, and the management policies used to store data. For example, implementing a new tier and moving data from one tier to another may change the amount of storage utilization associated with the source and the target storage environments.

In a further embodiment, the target storage environment data 214 may include one or more reclamation variables that define an estimated reclamation of storage for the target storage environment as compared to the first storage environment. For example, the first storage environment may include unused data that can be deleted so that wasted space is reduced and the need to purchase additional storage capacity may be lessened. In one embodiment, a variable defining an estimated reclamation of storage for the target storage environment may include a per year percentage of anticipated reclamation for a certain time period such as five or ten years. In another embodiment, the target storage environment data 214 may include one or more variables related to improved storage utilization of the target storage environment as compared to the first storage environment.

In one embodiment, the target storage environment data 214 may include one or more target component cost variables that define a cost associated with one or more of the software and hardware components of the target storage environment.

The target component cost variable may include a per year cost for a specified time period. For example, in a new storage system, the first year cost may include purchasing all of the initial equipment necessary to implement the storage system. Thus, the first year cost variable may be much higher than subsequent years. Depending on a rate of technology refresh or component replacement, a per-year cost may differ dramatically from year to year or may be spread out over several years.

The target storage environment data 214 in one embodiment may include one or more target power variables that define an amount of power consumed by the target storage environment. In one embodiment, the target power variables may specify an amount of power or cost of power consumed per year. The amount of power or cost of power may vary depending on the amount of storage, the type of storage devices, and the power efficiency of the storage environment.

In one embodiment, the target storage environment data 214 may include one or more variables that define an estimated movement of storage from tier to tier in a multi-tier environment. For example, data in the first storage environment may be unnecessarily stored on the high cost storage in Tier 1. Therefore, moving data from Tier 1 storage to Tier 2 storage, reduces the need for the more expensive Tier 1 storage thereby affecting the overall requirement and cost of the target storage environment. In another embodiment, a new tier may be added and data may be moved from an existing tier to the new tier. For example, new low cost tape storage may be added, and non-mission critical may be moved from more expensive tiers of storage to the less expensive tape storage tier to increase low tier storage availability without purchasing new high-cost storage devices.

The cost module 206 of the storage environment analysis tool 110, in one embodiment, determines a cost associated with the first storage environment based on the received first storage environment data 212 and determines a cost associated with the target storage environment based on the received target storage environment data 214. Determining the cost associated with the first storage environment and the target storage environment may include various breakdown determinations such as determining a total cost, determining a cost per year, determining breakdown costs such as per tier costs, determining a cost for each type of storage, or the like. The cost module 206 may access various formulas, algorithms, and may make calculations based on the first storage environment data 212 and the target storage environment data 214 to determine the cost of the corresponding storage environments. In some instances, default cost values may be used by the cost module 206 to determine an overall cost or other breakdown cost associated with a storage environment.

The cost module 206 may generate data to be presented in graphical form such as in a table, chart, or graph. The cost module 206, in one embodiment, to immediately update cost totals and results in response to a change in one or more defined variables. This enables a user to quickly observe the cost effect of changing each variable has on the overall cost or on specific breakout costs associated with a storage environment. This enables a user to fine tune a target storage environment to get the greatest benefit for the lowest cost.

The comparison module 208 compares the determined cost of the first storage environment to the determined cost of the target storage environment. In one embodiment, this may include comparing the cost of associated with various components or variables of the first storage environment and the target storage environment. For example, the comparison module 208 may compare new storage costs by year of the first storage environment and the second storage environment. In another example, the comparison module 208 may compare the total cumulative cost of the first storage environment with the total cumulative cost of the target storage environment. The storage environment analysis tool 110 may be configured in some embodiments to enable quick adjustment of the variables of the first storage environment data 212 and the target storage environment data 214 to observe how changes in the different variables affect the comparison costs determined by the comparison module.

In one embodiment, the comparison module 208 may be configured to make both general macro-comparisons between various storage environments (e.g. compare total costs) and specific detailed comparisons between specified components or portions of a storage environment (e.g. comparing just staffing costs or costs per terabyte). In a further embodiment, the comparison module 208 may be configured to populate tables or graphs or the like with comparison data for quick observance by a user.

The display module 210, in one embodiment, displays the results of the compared costs. The display module 210 may generate graphs or tables to provide a depiction of the comparison results in a format preferred by a user. The storage environment analysis tool 110, in one embodiment, is configured to generate views and windows that can be manipulated by a user to depict the comparison results as desired. For example, a bar graph may be generated depicting a comparison of the cumulative cost of the first storage environment with the target storage environment by year. A user may be able to manipulate the scale of the graph or may alter variables to observe how the bar graph or table data changes accordingly. In one embodiment, the display module 210 automatically generates certain charts or graphs associated with comparing storage system costs, and in other embodiments, a user may be able to create a specific graphical comparison using charts, graphs, tables and the like.

In one embodiment, the display module 210 displays one or more of storage by tier by year for the first storage environment and the second storage environment, cash flow by year for the first storage environment and the second storage environment, power consumption by year for the first storage environment and the second storage environment, and labor costs by year for the first storage environment and the second storage environment. The displays may be presented in various graphical forms such as pie charts, bar graphs, tables, or the like. A typical cost comparison summary may include a total storage capacity for each storage environment, an amount of storage for each tier in each storage environment, a total cost of new disk storage per year for each storage environment, a total amount of storage by year available in each storage environment, a percentage utilization of storage for each storage environment, a cumulative cost of all storage for each storage environment, and other like cost comparisons.

Figure 3:
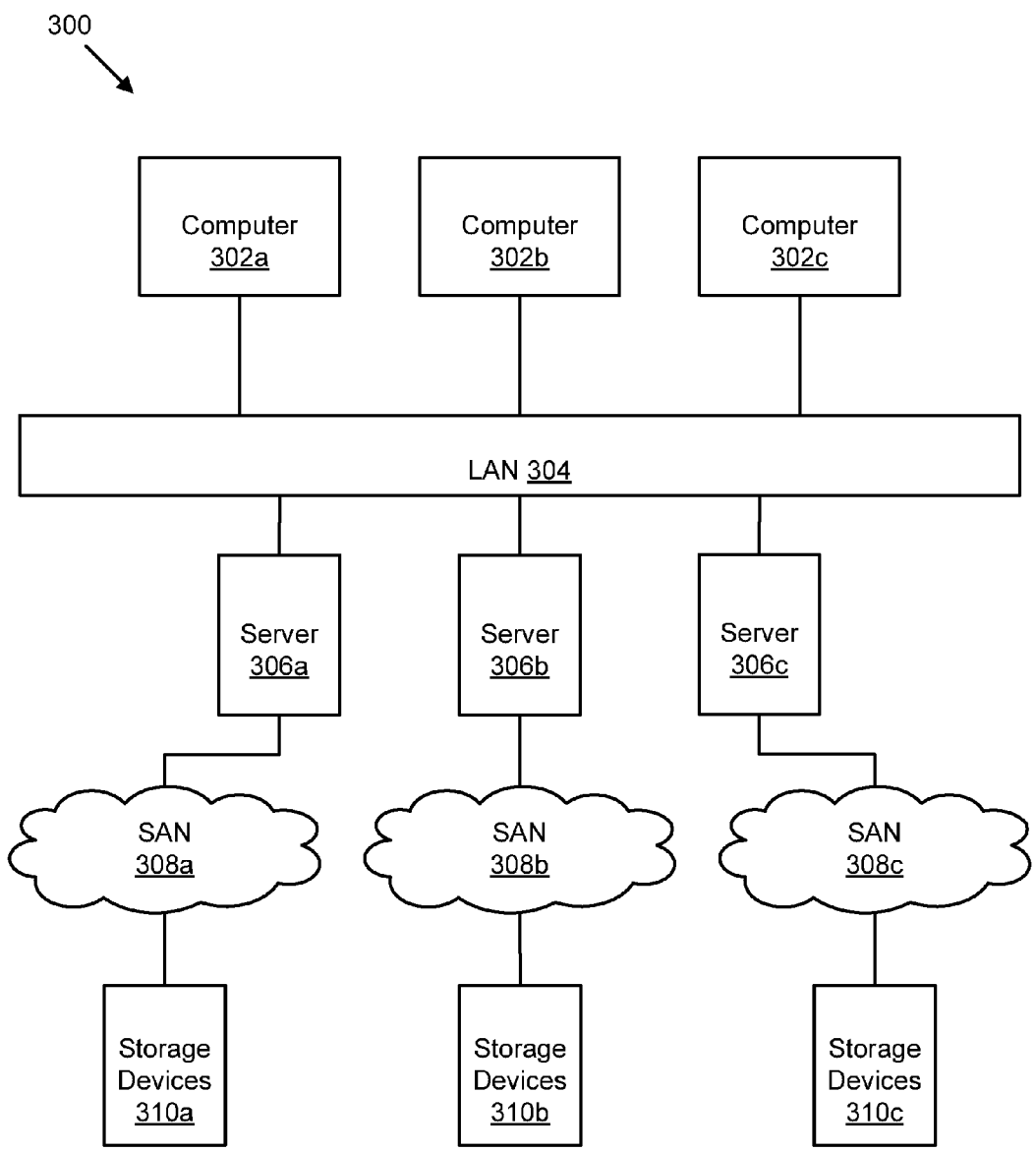
FIG. 3 is a schematic block diagram illustrating one embodiment of a storage environment in accordance with the present invention.

FIG. 3 is a schematic block diagram illustrating one embodiment of a storage environment 300 in accordance with the present invention. The depicted storage environment 300 is provided as an example of a storage environment and numerous configurations, components, and architectures are contemplated which are not shown in FIG. 3. In the depicted embodiment, the storage environment 300 includes computers 302*a-c*, a local area network ("LAN") 304, servers 306*a-c*, SANs 308*a-c*, and storage devices 310*a-c*. The storage environment analysis tool 110 may be used to analyze the storage environment 300 to determine various costs associated with the storage environment 300. In one embodiment, the storage environment 300 represents a currently existing storage environment operating under business-as-usual operations.

As depicted, the computers 302a-c are connected to the LAN 304. Through the LAN 304, the computers 302a-c may access one or more of the servers 306a-c in order to access one or more of the SANs 308a-c. The SANs facilitate access to various storage devices 310a-c so that the computers 302a-c have the ability to store or retrieve data from the storage devices 310a-c. The storage system 300 is a simplified storage system, and as noted above, real-world storage systems can be very complex. Numerous elements can affect the overall cost of a storage system which makes cost analysis, business planning, and return-on-investment analyses very difficult. This means that it is difficult to assess the cost benefits of making changes to the storage environment 300.

Figure 4:
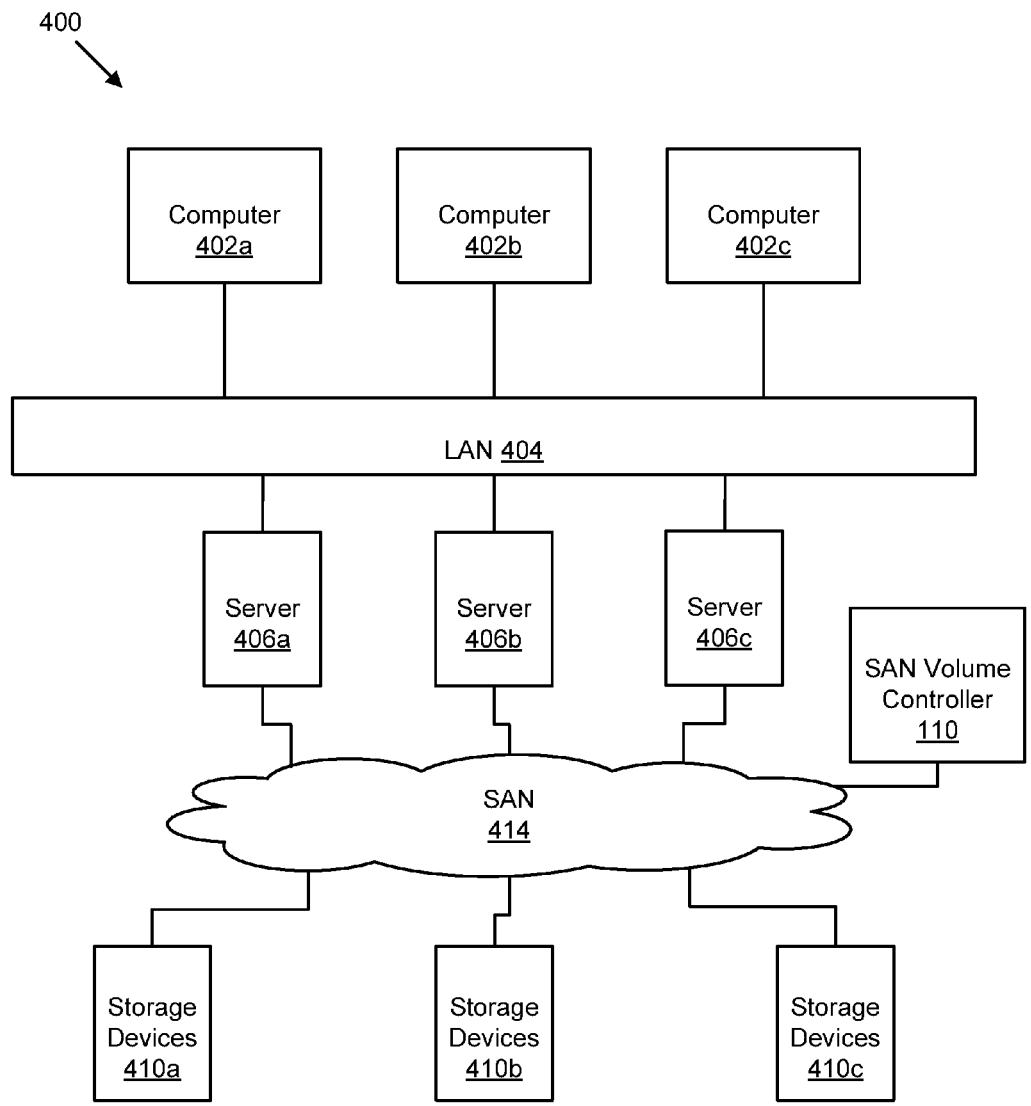
FIG. 4 is a schematic block diagram illustrating one embodiment of a target storage environment in accordance with the present invention.

FIG. 4 is a schematic block diagram illustrating one embodiment of a target storage environment 400 in accordance with the present invention. Again, the depicted target storage environment 400 is provided as an example of a storage environment and numerous configurations, components, and architectures are contemplated which are not shown in FIG. 4. The depicted storage environment 400 is provided as an example of a storage environment and numerous configurations, components, and architectures are contemplated which are not shown in FIG. 3.

As depicted, the target storage environment 400 is similar to the first storage environment 300, and it includes computers 402a-c, a LAN 404, storage servers 406a-c, and storage devices 410a-c. However, the storage environment 400 depicts the SAN Volume Controller 412 that enables all of the storage devices 410a-c to appear as a single storage volume in a single SAN 414. The change from the first storage environment 300 to the target storage environment represents a potential change in from the storage systems 300 to the target storage system 400 as well as a potential cost savings or benefit from improved storage control and ease of movement of data between tiers. It should be noted that there are numerous changes or adjustments that may be presented in a target storage environment, and the simplified depiction in FIG. 4 is just one example of a possible change.

Figure 5:
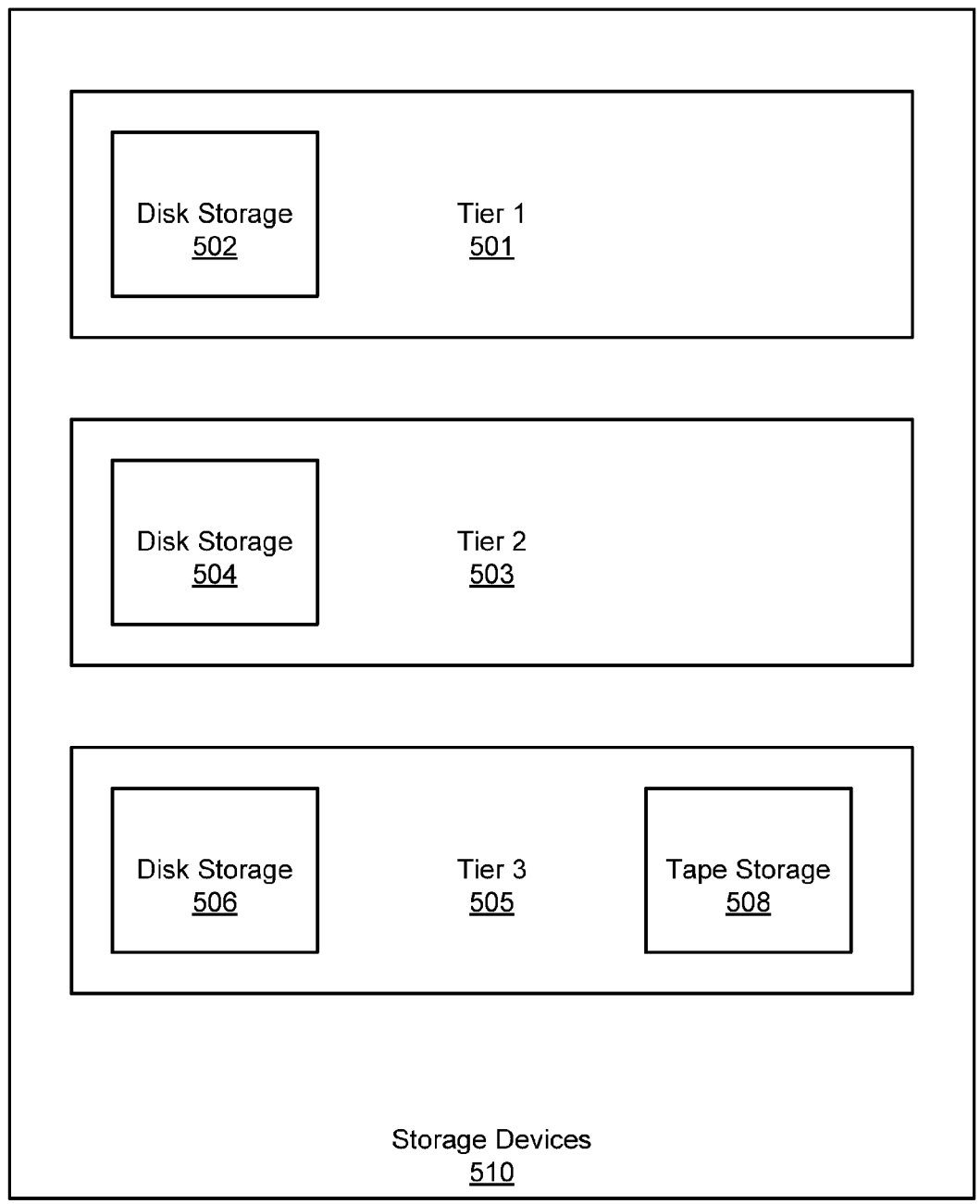
FIG. 5 is a schematic block diagram illustrating one embodiment of multi-tiered storage devices in accordance with the present invention.

FIG. 5 is a schematic block diagram illustrating one embodiment of multi-tiered storage devices 510 in accordance with the present invention. As noted above, in some embodiments, storage may be divided into tiers representing different levels of reliability, speed, availability, power consumption, cost, and the like. In the depicted embodiment, three tiers are shown. Of course, in other embodiments, more or fewer tiers may be utilized.

In one embodiment, Tier 1 storage 501 may include enterprise class, high performance, high reliability, disk storage 502. Tier 1 storage 501 typically utilizes high redundancy and high speed configurations to store mission critical data. The cost of Tier 1 storage 501 is often very expensive relative to less critical storage elements. Currently, Tier 1 storage 501 can be as expensive as about $10,000-$20,000 per terabyte of storage depending on the type of storage used.

Tier 2 storage 503, in one embodiment, may also use disk storage, albeit less expensive disk storage 504 typically with less reliability and performance. Tier 2 storage 503 is often used for storing data for non-critical applications or rarely used applications. Currently, Tier 2 storage 503 can be as expensive as about $6,000-$8,000 per terabyte. Tier 3 storage 505 often includes low performance disk storage 506 or low-cost tape storage 508. Tier 3 storage 505 typically has a very high storage capacity and may store data for applications with low frequency of use or non-critical data. Currently, Tier 3 storage can be as expensive as about $2,000-$3,000 per terabyte. Of course the costs associated with different types and qualities of storage vary greatly over time.

The business environment analysis tool 110 is able to determine and compare costs of storage environments that use multi-tier storage systems. The tool 110 is able to determine costs and savings associated with environment changes such as adding new tiers or migrating data from one tier to another, including determining costs and savings realized over time such as avoiding the purchase of new Tier 1 storage 501 by moving non-critical data to Tier 2 or Tier 3 storage 503, 505. By modeling the cost savings associated with the multi-tiered environments and different storage configurations available within multi-tier environments, the business environment analysis tool 110 allow determination of a course of action that will provide better benefits and lower total storage costs over time, even in multi-tier environments.

Figure 6:
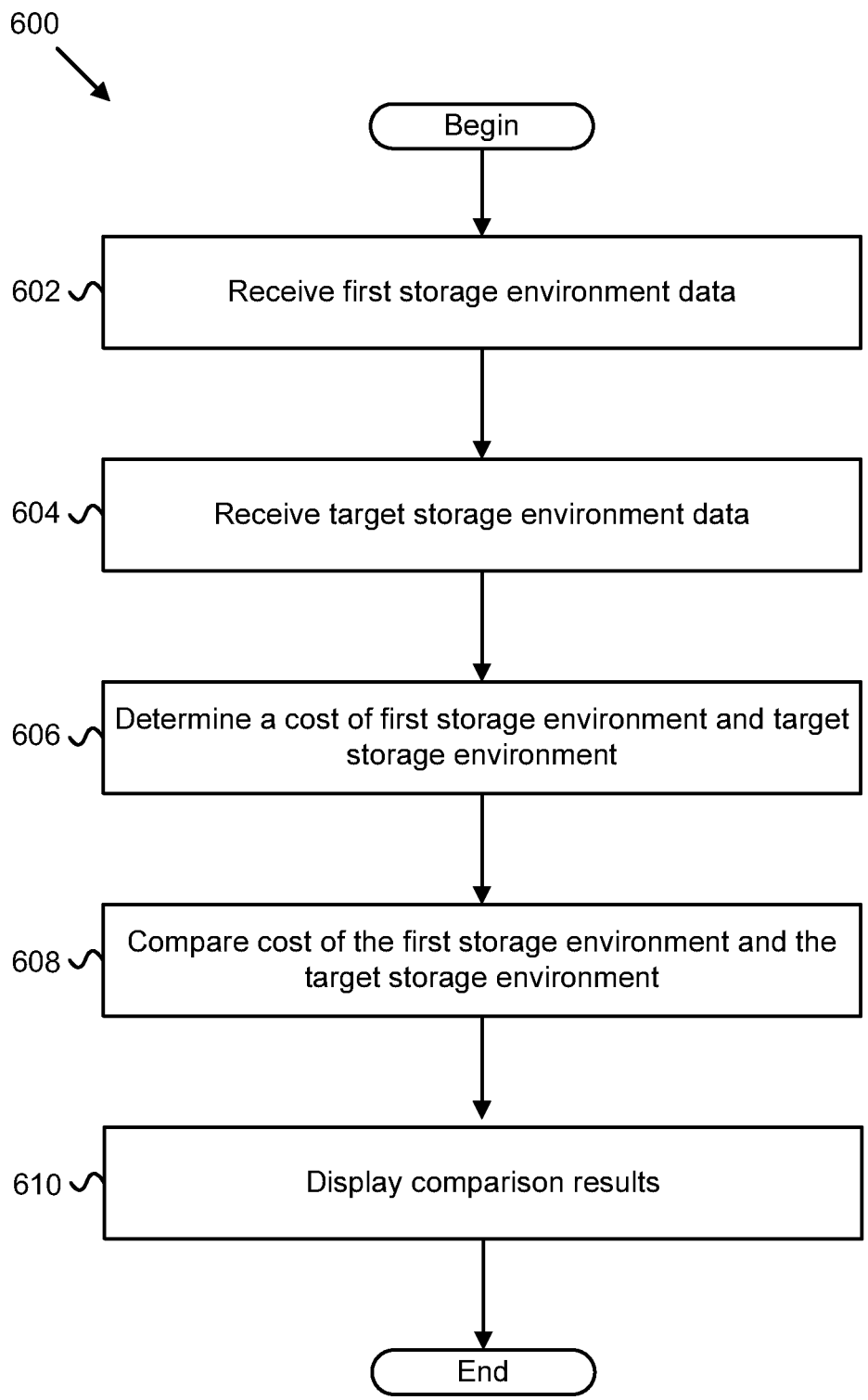
FIG. 6 is a schematic flow chart diagram illustrating one embodiment of a method for analyzing storage environment costs in accordance with the present invention.

FIG. 6 is a schematic flow chart diagram illustrating one embodiment of a method 600 for analyzing storage environment costs in accordance with the present invention. The method 600 includes the steps, functionality, and embodiments described above with regard to FIGS. 1-5. The method 600 includes operations for determining and comparing the costs of a first storage environment with a target storage environment.

The method 600 begins when a first input module 202 receives 602 first storage environment data 212 corresponding to a first storage environment. In one embodiment, the first storage environment data 212 includes one or more variables associated with a cost of the first storage environment. Next, a second input module 204 receives 604 as input target storage environment data 214 corresponding to a target storage environment. In one embodiment, the target storage environment data includes one or more variables associated with a cost of the target storage environment. In one embodiment, the target storage environment represents a potential improvement or replacement storage environment for the first storage environment.

Next, a cost module 206 determines 606 a cost associated with the first storage environment based on the received first storage environment data 212 and determines a cost associated with the target storage environment based on the received target storage environment data 214. Then, a comparison module 208 compares 608 the determined cost of the first storage environment to the determined cost of the target storage environment. A display module 208 may display 610 the results of the compared costs.

In one embodiment of the method 600, the first storage environment and the target storage environment are multi-tier storage environments, and the first storage environment data 212 and target storage environment data 214 include one or more variables associated with a cost of implementing a multi-tier storage environment. In a further embodiment, the first storage environment data 212 comprises one or more storage-per-tier variables that define a total amount of storage per tier of the first storage environment, and the target storage environment data comprises one or more storage-per-tier variables that define a target amount of storage per tier for the target storage environment.

Figure 7:
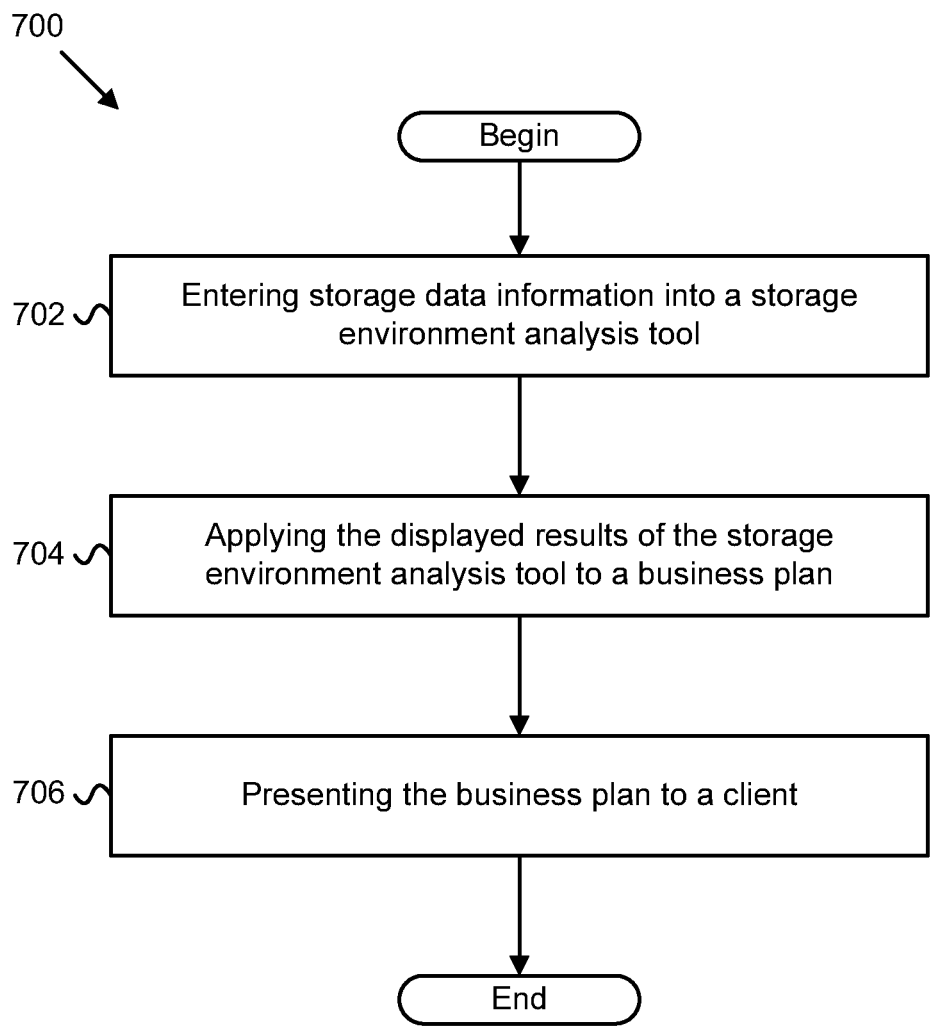
FIG. 7 is a schematic flow chart diagram illustrating one embodiment of a method 700 for analyzing storage environment costs in accordance with the present invention.

FIG. 7 is a schematic flow chart diagram illustrating one embodiment of a method 700 for analyzing storage environment costs in accordance with the present invention. The method 700 includes the steps, functionality, and embodiments described above with regard to FIGS. 1-6. The method 700 includes operations for operating and implementing the storage environment analysis tool 110 to determine and compare the costs of a first storage environment with a target storage environment.

The method 700 begins by entering 702 storage data information into a storage environment analysis tool 110, where the storage environment analysis tool 110 includes the modules and embodiments described above to generate comparison results of a cost of a first storage system and a target storage system and to display the comparison results. Next, the method 700 includes applying 704 the displayed comparison results to a business plan. Typically, a business plan is a written or oral presentation of a plan for future business operations and processes that includes a cost/benefit analysis of the proposed plan. In accordance with the present invention, a user may demonstrate that a target storage environment is more beneficial or less expensive than a current storage environment based on the comparison results generated by the storage environment analysis tool 110. Finally, the business plan is presented 706 to a client.

In determining and estimating costs associated with different storage environments, the cost module 206 may utilize basic assumptions based on potential products or services that may be used in accordance with the storage systems. For example, using TSPC for data allows the identification of unused data that can be deleted so that wasted space is reclaimed and the need for additional storage capacity is reduced. A tool such as TSPC may have an estimated initial impact of reclaiming about 18% of used storage. The SAN Volume Controller enables all storage to be treated as a common pool which may result in an improved storage utilization of about 10%. Other products may be implemented to achieve similar improvements.

In some cases moving data from a more expensive tier to a less expensive tier (e.g. Tier 1 to Tier 2) or moving data from online to offline storage (e.g. Tier 2 to Tier 5) may free up additional space or reduce storage costs. Tools from various vendors such as IBM and Novus may be implemented to realize these space and costs savings as will be recognized by one of skill in the art. In some embodiments, cost or storage savings assumptions may be used by the cost module 206 to make cost calculations and storage savings determinations. In some cases, such assumptions may be made based on data provided by a vendor or provider of a particular storage environment product or service. All potential products and services can not be listed here, but it is contemplated that the storage environment analysis tool 110 may be configured to incorporate cost and benefit data for various available storage environment components and tools as recognized by one of ordinary skill in the art.

FIGS. 8-23 include screenshots of various embodiments of an interface for the storage environment analysis tool 110. Screenshots of every interface and display of the storage environment analysis tool 110 are not included, but these screenshots are provided as examples types of interfaces, variables, tables, and the like that may be utilized by the storage environment analysis tool 110.

Figure 8:
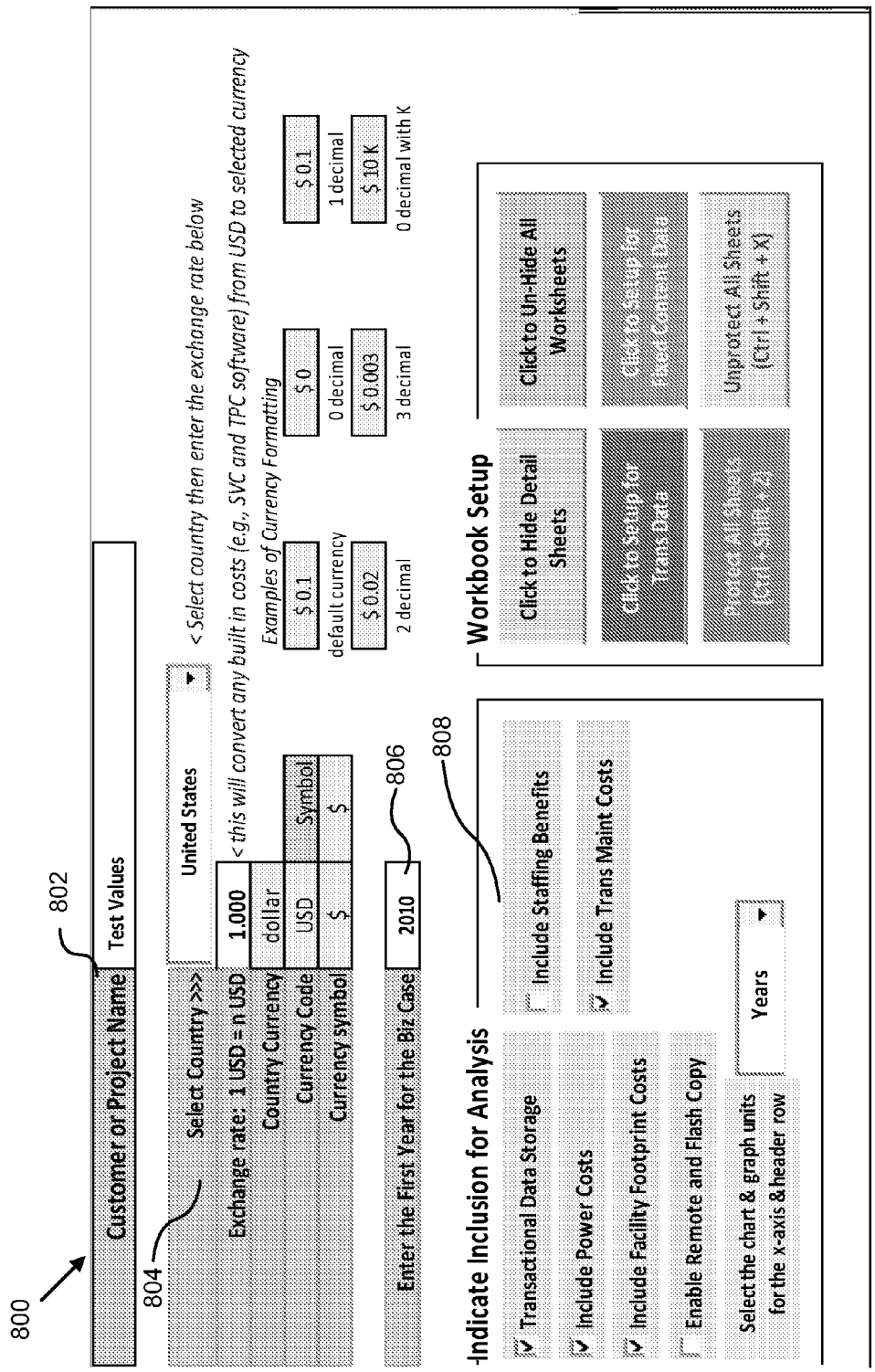
FIG. 8 is a screenshot of one embodiment of a data input form for a storage environment analysis tool in accordance with the present invention.

FIG. 8 depicts one embodiment of a data input form 800 for a storage environment analysis tool 110 in accordance with the present invention. In the depicted embodiment, the data input form may act as an interface for the first and second input modules 202 and 204 as described above. The input form 800 includes a customer or project name 802, a selected country with a specified currency and exchange rate 804, a first to year to begin the analysis 806, and other format options. The input form allows a user to select various cost factors 808 to include or not include in the storage environment cost analysis. Such factors, in the depicted embodiment, may include transaction data storage costs, power costs, facility footprint costs, staffing or labor costs, maintenance costs, and the like. In some embodiments, separate data input forms may be provided corresponding to each selected cost factor to be included in the analysis.

Figure 9:
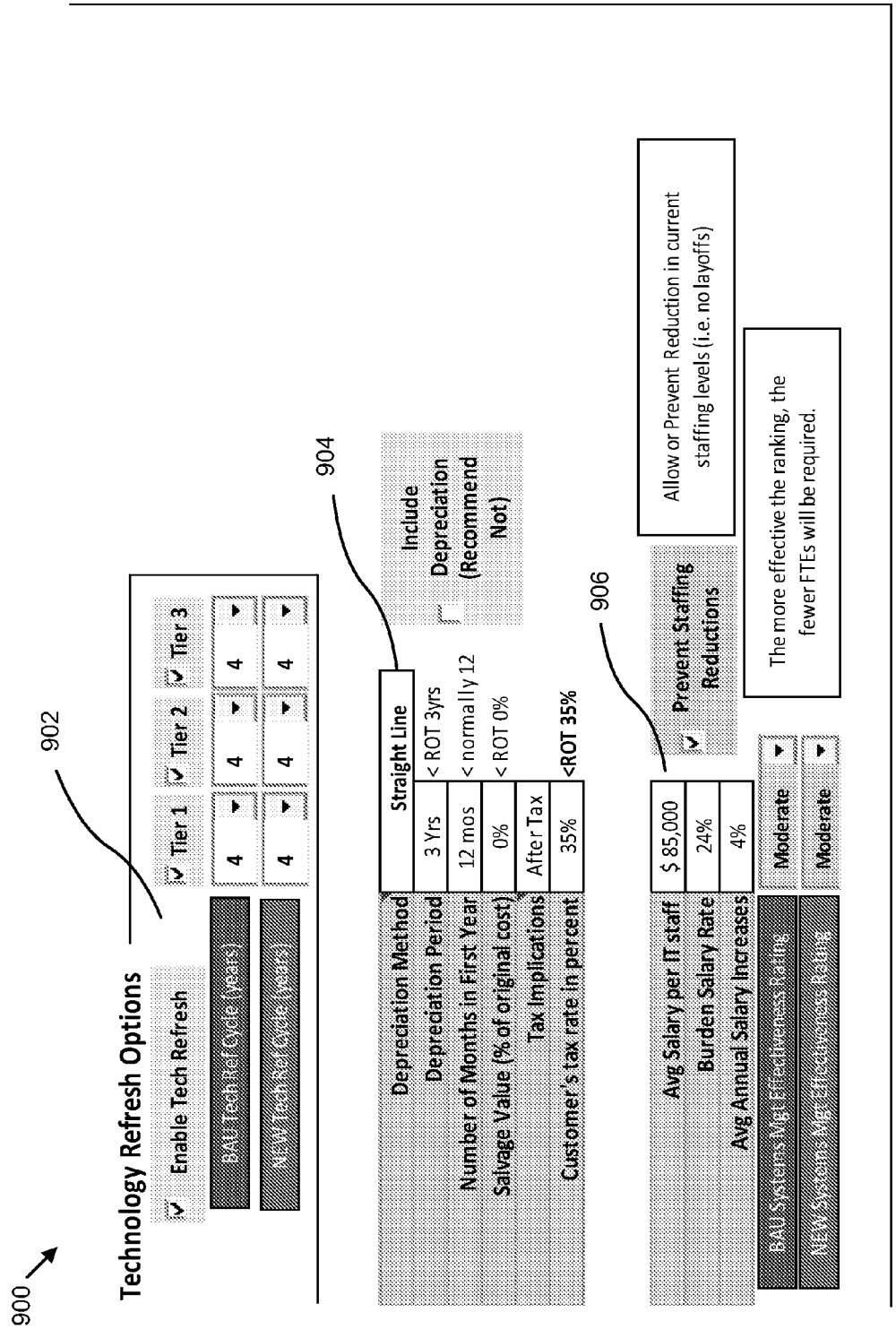
FIG. 9 is a screenshot of one embodiment of a data input form for a storage environment analysis tool in accordance with the present invention.

FIG. 9 is a screenshot of one embodiment of another data input form 900 for a storage environment analysis tool 110 in accordance with the present invention. The data input form 900, in the depicted embodiment, includes one or more technology refresh variables 902 for specifying a time period (e.g. number years) before a storage system's technologies and components should be refreshed or replaced with updated technologies. As depicted, a technology refresh period is defined as four years for each tier in a business s-as-usual ("BAU") storage environment (e.g. current storage environment or first storage environment) and in this case, the same refresh period is selected for each tier for a NEW or target storage environment. In one embodiment, technology refresh may be specified for fewer than all of the tiers in each storage environment.

The data input form 900 also includes one or more depreciation variable 904 to specify inclusion or exclusion of depreciation calculations into the storage environment cost analysis and to specify a type of depreciation method to use. If an analysis is selected to include staffing and labor costs, staffing variables 906 affecting the staffing costs may be specified. In the depicted embodiment, an average salary per IT staff member, a burden salary rate, and salary increases are included in the calculation. An option is also provided in the depicted embodiment to prevent staffing reductions in the cost analysis.

Figure 10:
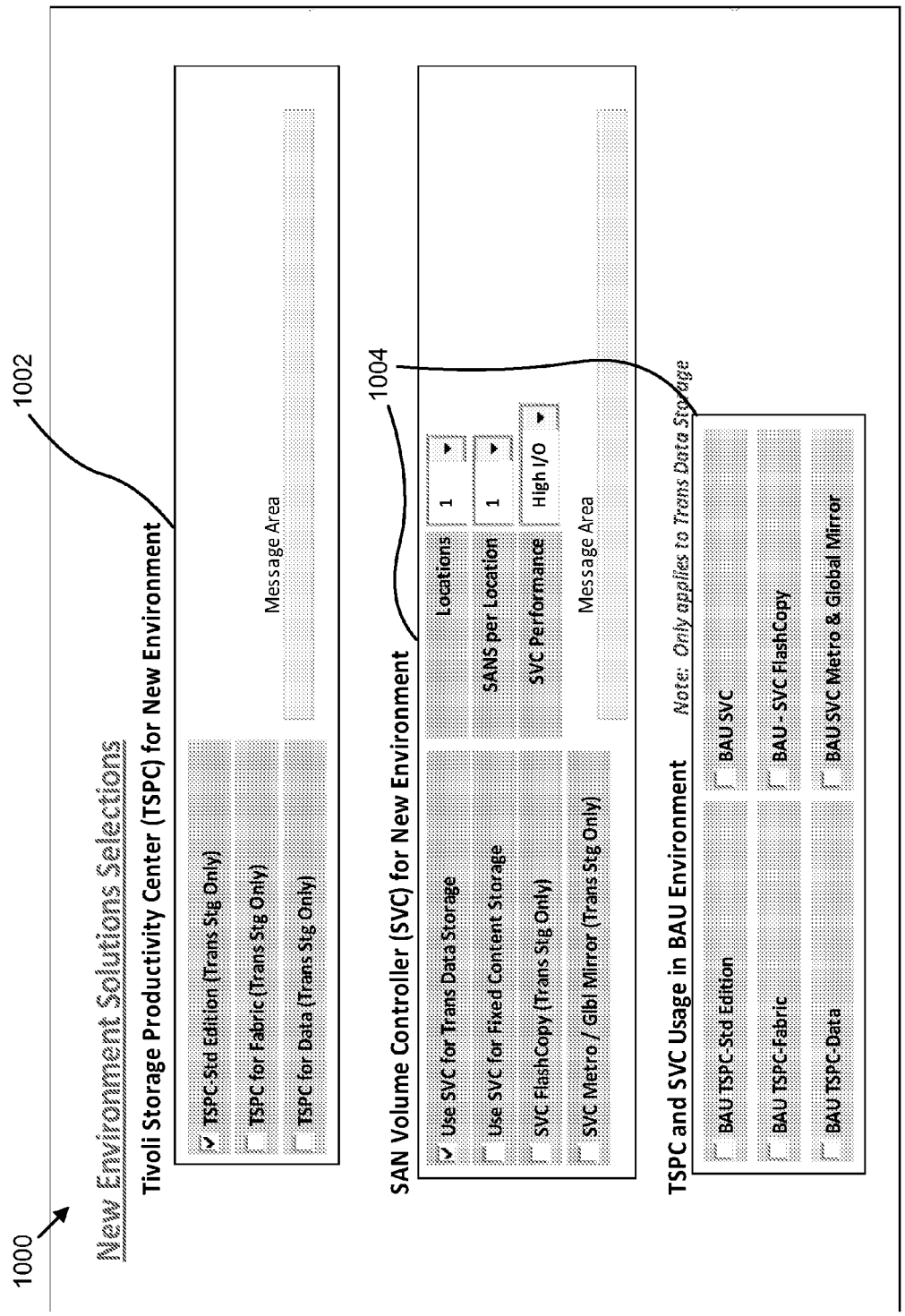
FIG. 10 is a screenshot of one embodiment of a data input form for a storage environment analysis tool in accordance with the present invention.

FIG. 10 is a screenshot of one embodiment of another data input form 1000 for a storage environment analysis tool 110 in accordance with the present invention. The data input form 1000 in the depicted embodiment includes options 1002 for including various options for TSPC and SVC and their associated costs in the storage environment cost analysis. Similarly, the data input form 1000 in the depicted embodiment includes options 1004 for specifying whether the first or BAU storage environment already uses TSPC or SVC and which version is being used. As depicted, the BAU environment does not use either TSPC or SVC and the target environment includes both.

Figure 11:
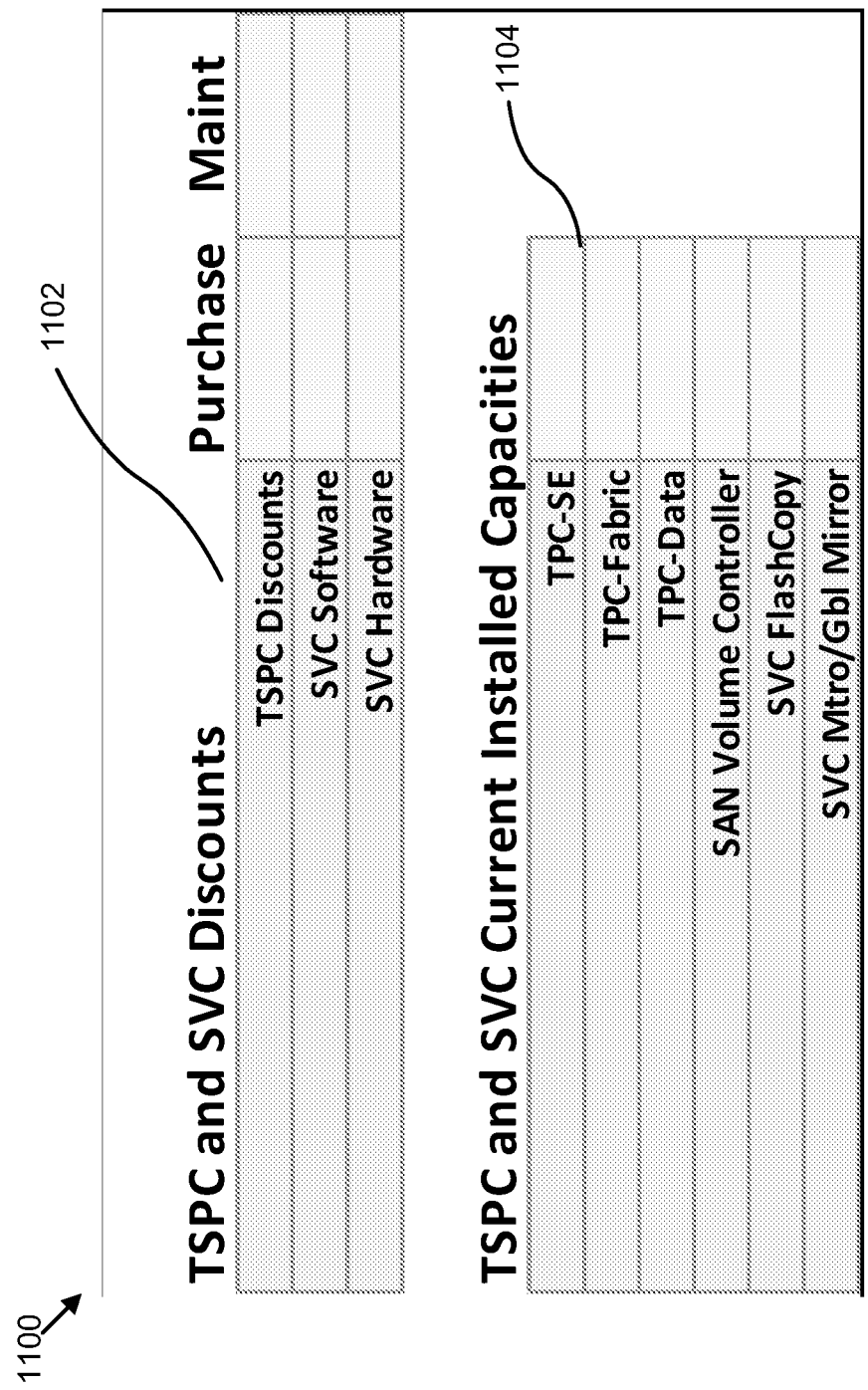
FIG. 11 is a screenshot of one embodiment of a data input form for a storage environment analysis tool in accordance with the present invention.

FIG. 11 is a screenshot of one embodiment of another data input form 1100 for a storage environment analysis tool 110 in accordance with the present invention. The data input form 1100 enables a user to specify various discounts 1102 and currently installed capacities 1104 associated with purchasing and maintaining TSPC and SVC. Purchasing and licensing discounts may, in some instances, significantly affect the overall cost of a storage system.

Figure 12:
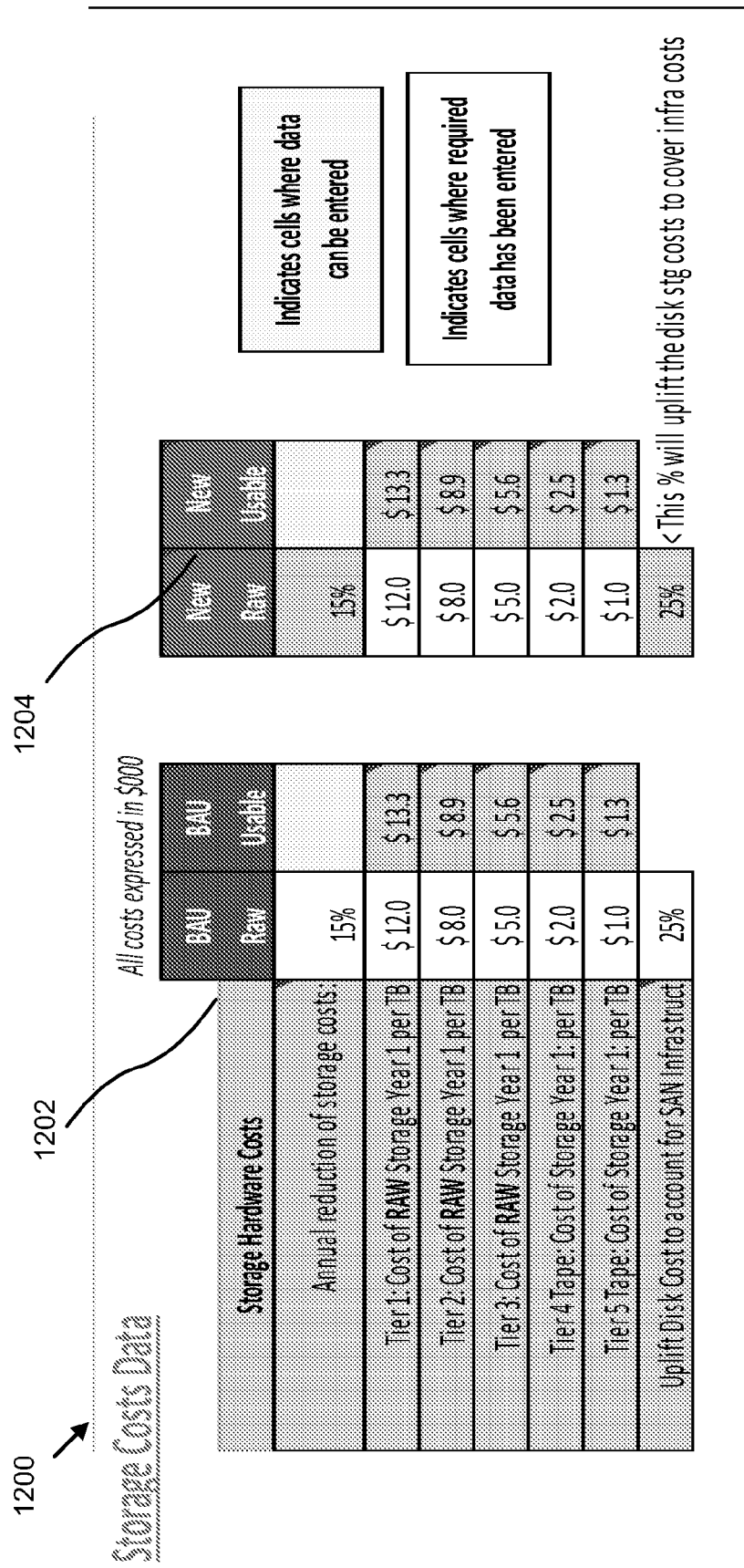
FIG. 12 is a screenshot of one embodiment of a data input form for a storage environment analysis tool in accordance with the present invention.

FIG. 12 is a screenshot of one embodiment of a data input form 1200 for a storage environment analysis tool 110 in accordance with the present invention. The data input form 1200 includes storage input variables 1202 for specifying a cost of RAW storage per terabyte for the first year or initial year of the first or BAU storage system. The input variables 1202 may include an anticipated reduction of storage costs and may uplift the disk cost amounts to account for SAN infrastructure costs. Similar cost variables 1204 are provided for the NEW or target storage system. The per terabyte storage cost variables, in one embodiment, may specify both raw and usable storage. Furthermore, as depicted, the input forms may include shade or color or other types of indicators to denote where data is to be entered or where data has been entered.

Figure 13:
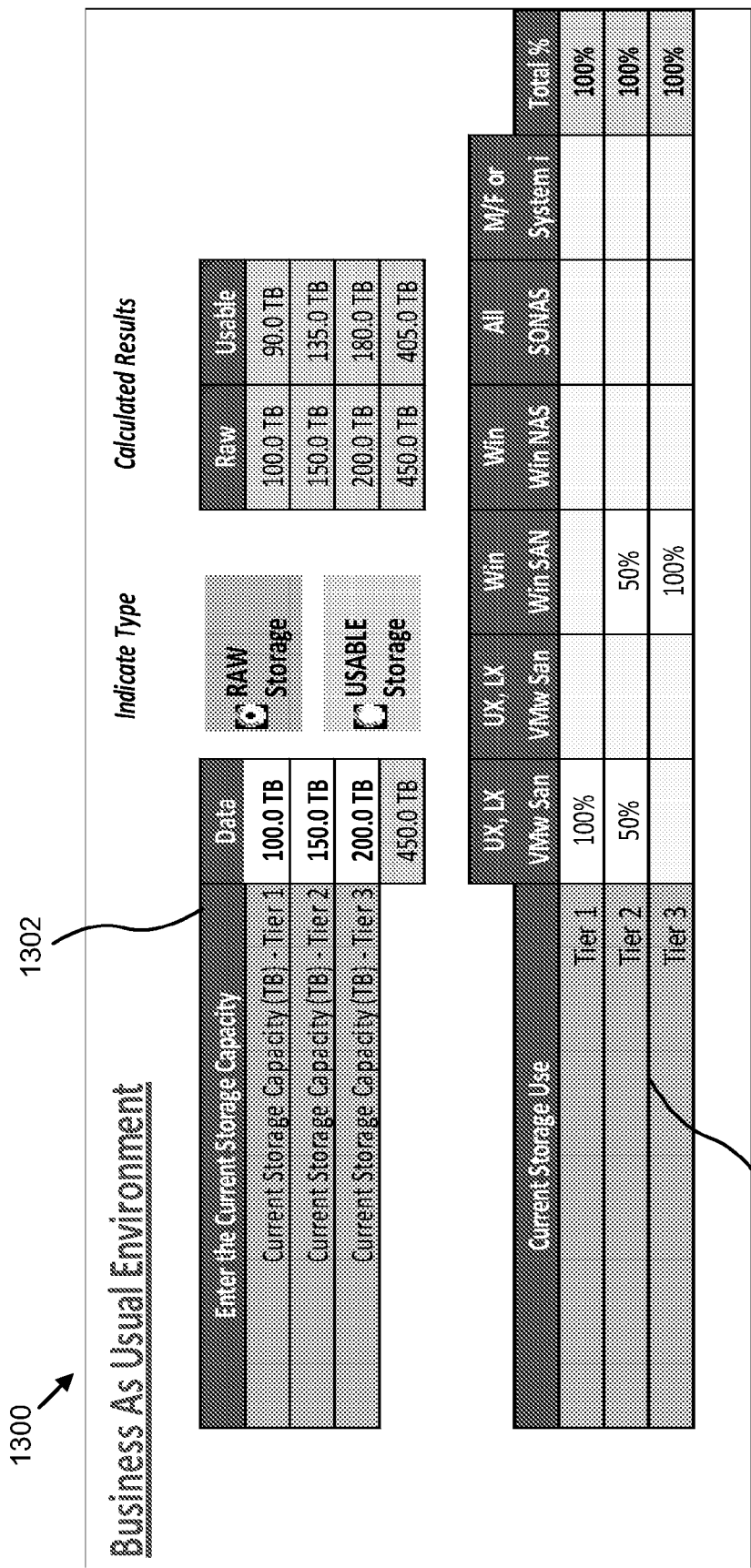
FIG. 13 is a screenshot of one embodiment of a data input form for a storage environment analysis tool in accordance with the present invention.

FIG. 13 is a screenshot of one embodiment of another data input form 1300 for a storage environment analysis tool 110 in accordance with the present invention. The data input form 1300 in the depicted embodiment includes variable input options 1302 for specifying a current storage capacity for each tier of the first or BAU storage environment. In one embodiment, a usable storage amount may be calculated from a raw storage amount or vice versa. In the depicted embodiment, Tier 1 includes 100 terabytes of raw storage which has resulted in 90 terabytes of usable storage. The BAU environment has a total raw capacity of 450 terabytes. The data input form 1300 also includes current storage use variables 1304 for specifying a current storage use for each tier and a type of operating system or system configuration associated with the current storage.

Figure 14:
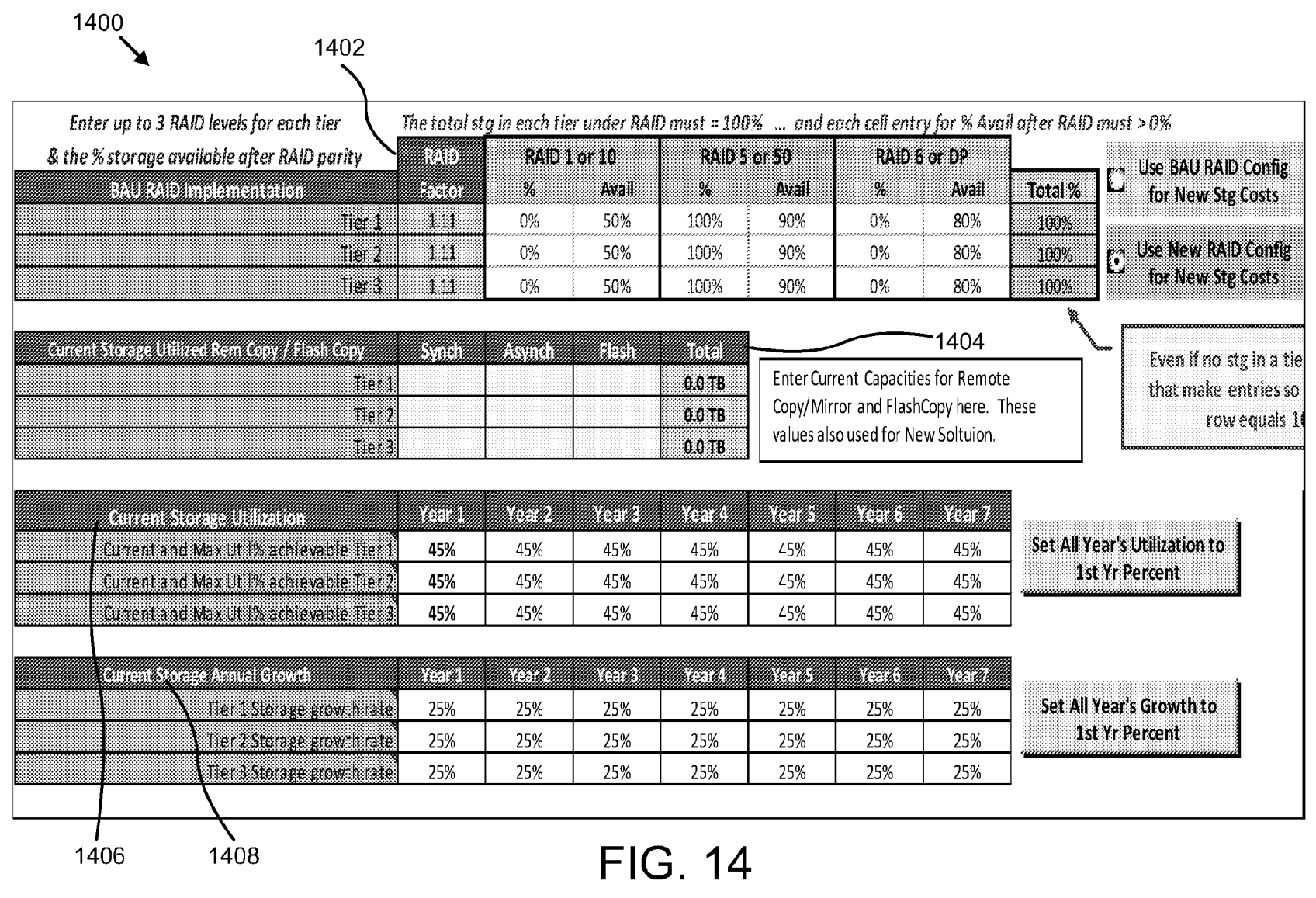

FIG. 14 is a screenshot of one embodiment of another data input form 1400 for a storage environment analysis tool 110 in accordance with the present invention. The data input form 1400 includes variables 1402 for further defining the configuration of the first or BAU storage environment including RAID variables 1402 for specifying redundant-array-of-independent-disks ("RAID") levels for each tier of storage and the percentage of storage available after RAID parity.

In the depicted embodiment, current capacities 1404 for remote copy/mirror and FlashCopy can also be specified, but are not used in the example. Utilization variables 1406 may also be used, in the depicted embodiment, to specify current storage utilization of the first or BAU storage environment and to specify anticipated or maximum utilization of storage resources for upcoming years. The data input form 1400 also includes data growth variables 1408 for specifying an estimated or anticipated amount of data growth over time. In the depicted example, a 25% growth rate per year for each tier is anticipated.

Figure 15:
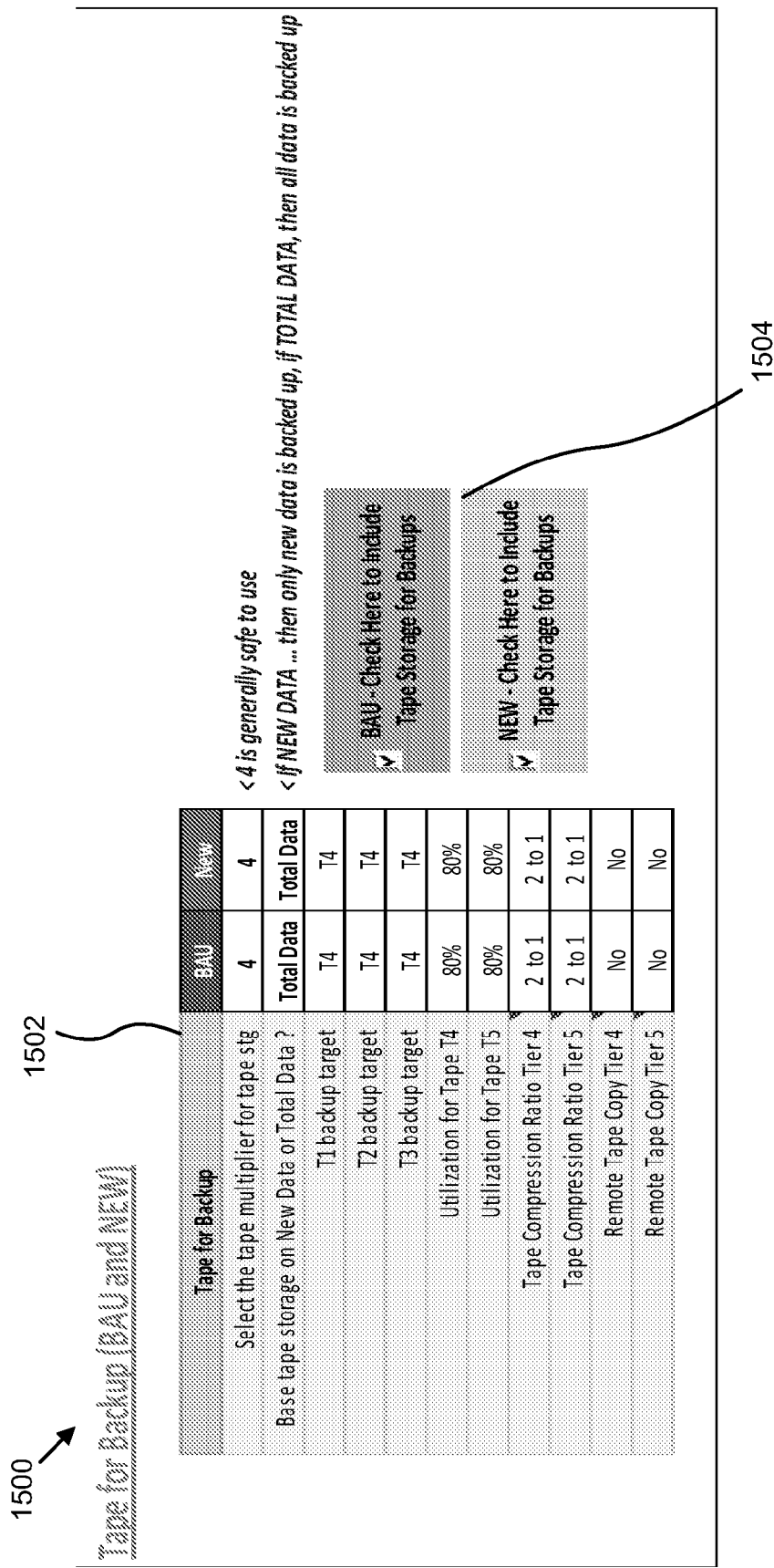
FIG. 15 is a screenshot of one embodiment of a data input form for a storage environment analysis tool in accordance with the present invention.

FIG. 15 is a screenshot of one embodiment of another data input form 1500 for a storage environment analysis tool 110 in accordance with the present invention. The data input form 1500 includes tape variables 1502 for specifying factors that affect that cost of tape storage for backup and storage in both the BAU and target storage environments. Some of the tape storage variables 1302 in the depicted embodiment include a tape multiplier, an indicator specifying whether the tape storage is for new data only or all data, an indicator for specifying a target for backup of each of the tiers (in the depicted embodiment Tiers 1, 2, and 3 are comprised of disk storage that backs up to tape storage in Tier 4), utilization percentage for tape storage in each tier, a tape compression ratio for each tier, and an indicator specifying whether or not remote tape copy is used for each tier. In some embodiments, variables 1504 may be used to indicate whether or not to include tape storage for backups or not for each of the BAU and target storage environments.

Figure 16:
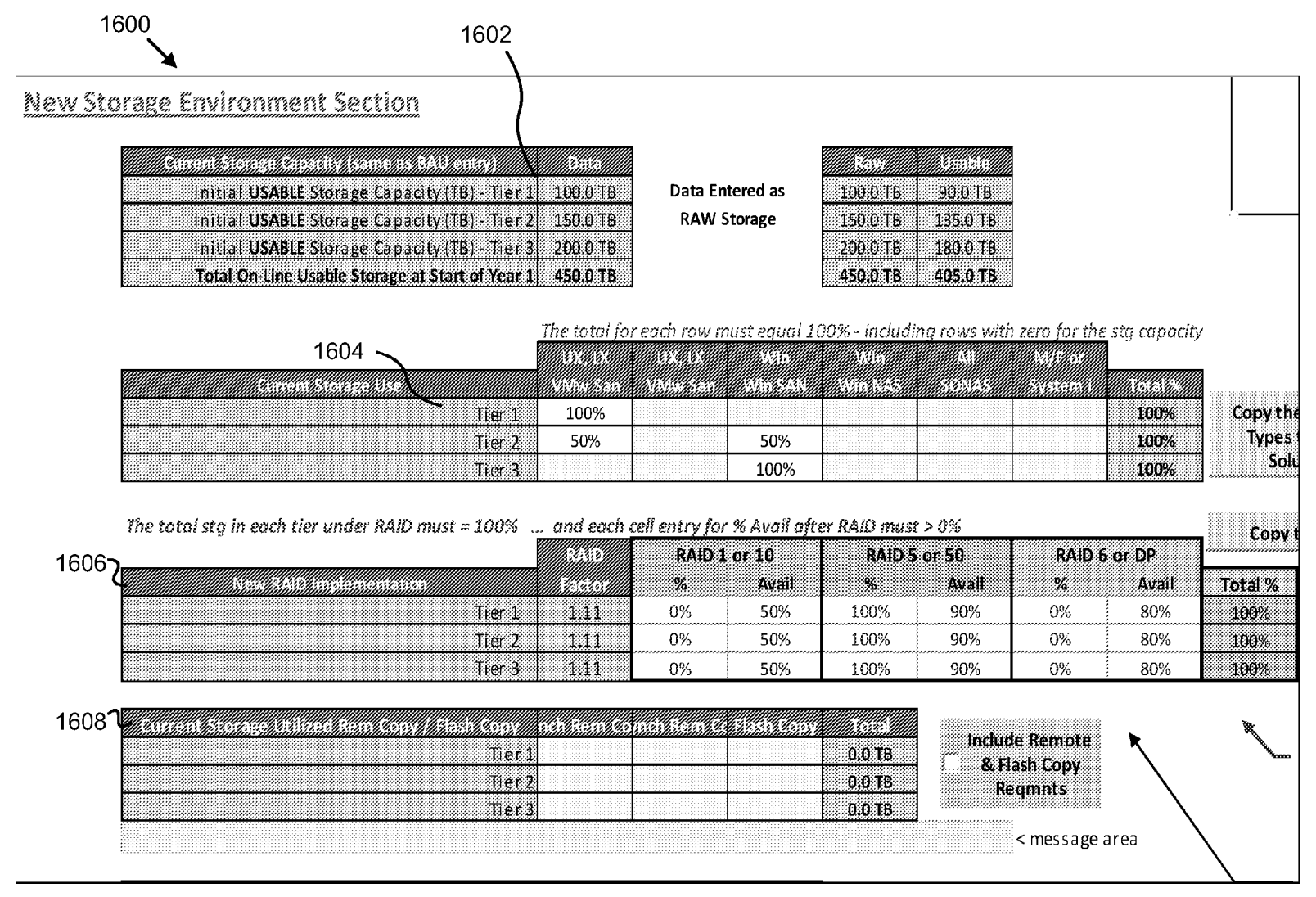

FIG. 16 is a screenshot of one embodiment of a data input form 1600 for a storage environment analysis tool 110 in accordance with the present invention. The data input form 1600 enables a user to define variables to specify storage requirements and capacities for the NEW or target storage environment. The data input form 1600 includes one or more storage capacity variables 1602 that define a current storage capacity for each tier of the target storage environment. As depicted Tier 1 of the NEW storage environment includes 100 terabytes of raw storage and 90 terabytes of usable storage. Again, in some embodiments, the usable storage amount may be calculated from the raw storage amount.

Similar to the variables associated with the BAU storage environment, storage variables 1604 are also provided to define storage use of each tier of the NEW storage environment, including specifying operating systems and configurations. RAID variables 1606 are also provided to specify RAID implementation for the NEW storage environment. In the depicted embodiment, current capacities 1404 for remote copy/mirror and FlashCopy storage can also be specified, but are not used in the depicted example.

Figure 17:
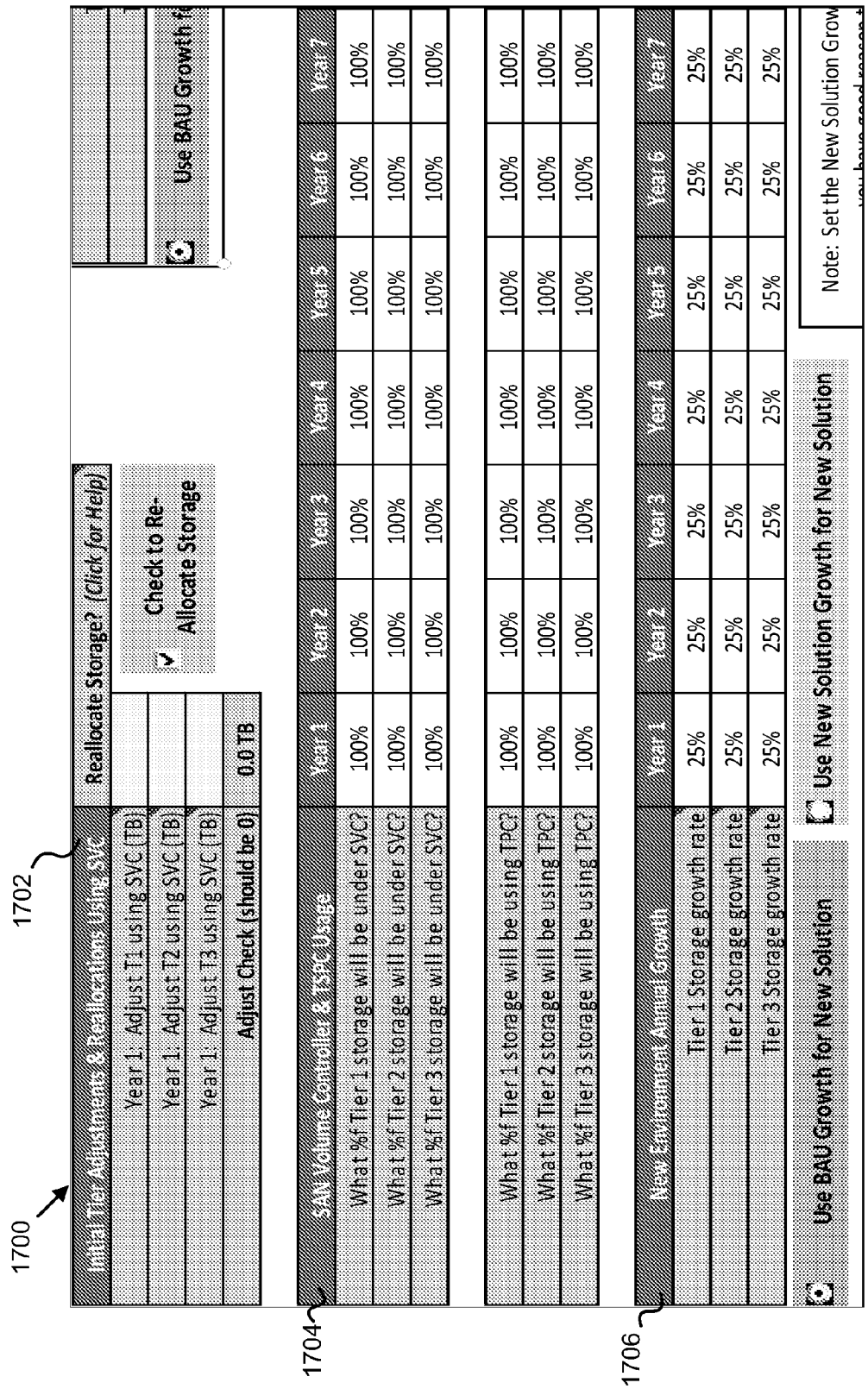
FIG. 17 is a screenshot of one embodiment of a data input form for a storage environment analysis tool in accordance with the present invention.

FIG. 17 is a screenshot of one embodiment of another data input form 1700 for a storage environment analysis tool 110 in accordance with the present invention. The data input form 1700, as depicted, includes storage adjustment and reallocation variables 1702 for specifying whether or not storage is to be reallocated using the SAN Volume Controller in the NEW or target storage environment. The data input form 1700 also includes variables 1704 for specifying an amount of usage of SVC and TSPC for each tier in the target storage environment. A data or storage growth rate variable 1706 is also provided for specifying how much storage growth is expected for each tier of the target storage environment by year.

FIG. 18 is a screenshot of one embodiment of a data input form 1800 for a storage environment analysis tool 110 in accordance with the present invention. The data input form 1800, in the depicted embodiment, enables a user to specify which NEW environment improvements to include in a cost analysis. For example, improvements based on tier disk movements may be toggled on or off, utilization percentage improvements may be toggled on or off, data archiving may be toggled on or off, etc. As depicted, a user may select or deselect a box corresponding to a particular improvement variable 1802 to specify which improvements should be considered in the analysis. A user may also edit utilization variables 1804 for each tier in the target environment by specifying a utilization improvement for each tier. In the depicted embodiment, a summary 1804 of storage space recovery improvements for each tier is displayed.

Figure 19:
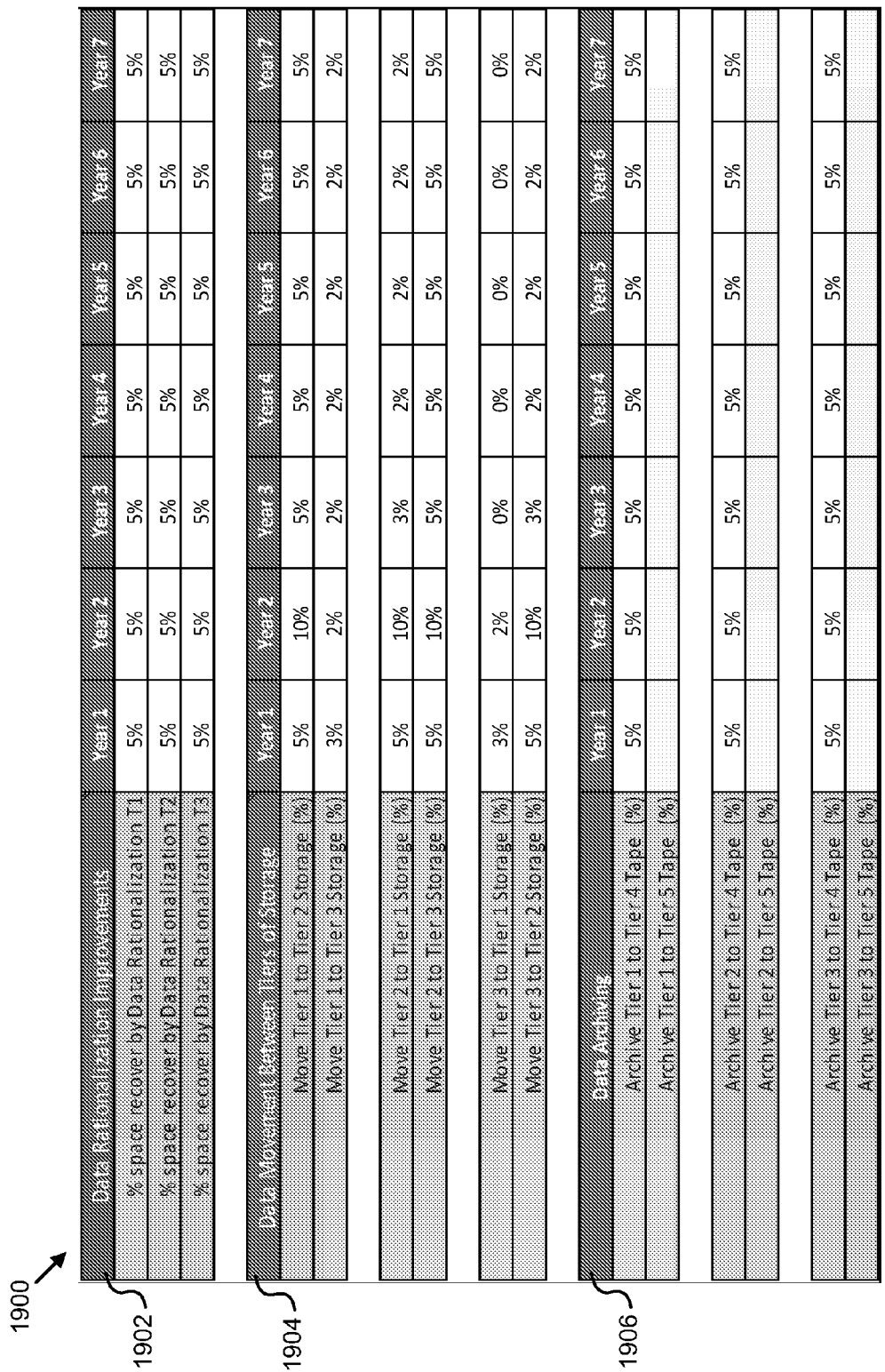
FIG. 19 is a screenshot of one embodiment of a data input form for a storage environment analysis tool in accordance with the present invention.

FIG. 19 is a screenshot of one embodiment of a data input form 1900 for a storage environment analysis tool in accordance with the present invention. As depicted, the data input form 1900 is a continuation of the data input form 1800 associated with the new environment improvements as discussed above. Each depicted section 1902, 1904, and 1906 corresponds to an improvement variable that may be toggled on or off as described above with regard to FIG. 18. In the depicted embodiment, data rationalization improvement variables 1902 are provided for defining space recovered by data rationalization for each tier. A user may edit or fine tune the variables 1902 by year for each tier of the storage environment. Similarly, in the depicted embodiment, data movement variables 1904 and data archiving variables 1906 are provided for editing or fine tuning improvements and storage usage per tier by year.

Figure 20:
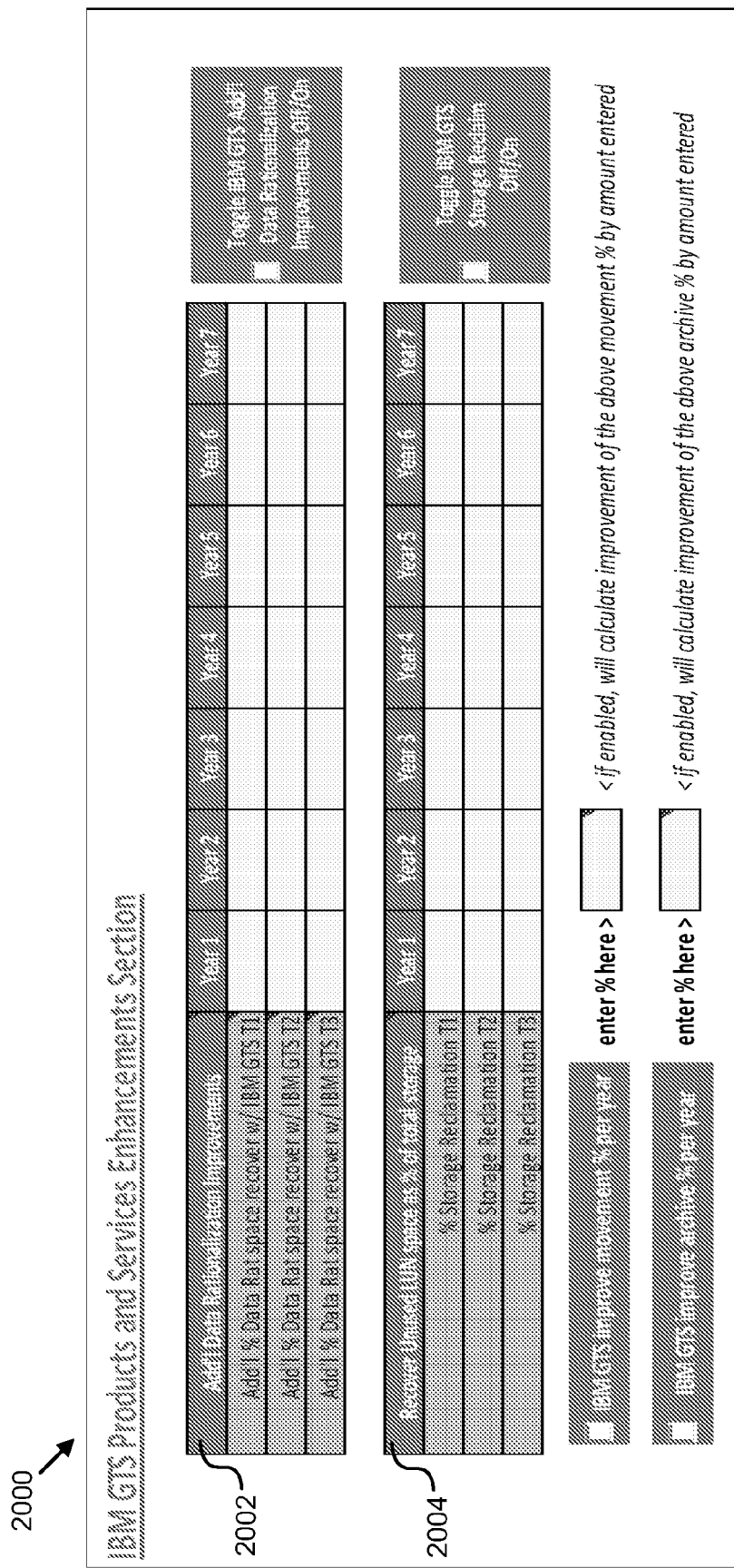
FIG. 20 is a screenshot of one embodiment of a data input form for a storage environment analysis tool in accordance with the present invention.

FIG. 20 is a screenshot of one embodiment of a data input form 2000 for a storage environment analysis tool 110 in accordance with the present invention. The data form 2000 in the depicted embodiment enables a user to define improvement variables 2002 realized by using specific products or services. In the depicted embodiment, additional data rationalization improvement variables 2002 and reclaimed space variables 2004 that are obtained from using International Business Machines' ("IBM's") Global Technology Services ("GTS") may be defined. In further embodiments, variables may be defined corresponding to other specific products and products from various vendors and service providers. In the depicted embodiments, the data rationalization improvement variables 2002 are defined as an additional percentage of data rationalization space recovered with IBM GTS for each tier by year. Similarly the reclaimed storage variables 2004 define a percentage of storage reclaimed for each tier by year.

FIG. 21 is a screenshot of one embodiment of a cost summary form 2100 for a first or BAU storage environment in accordance with the present invention. In the depicted embodiment, the cost summary form 2100 depicts the cost summary for the first or BAU storage environment. In the depicted embodiment, the cost module 206 utilizes first storage environment data 212 input into the various input forms and calculates a cost of the storage environment for the current year and for the future assuming a business as usual storage plan. As depicted, the BAU cost summary specifies the current capacities 2102 of storage for each tier of the BAU storage system, specifies the net new storage by year 2104, specifies the actual new storage by year 2106, and specifies the total cost of new disk storage 2108.

In one embodiment, the cost summary table 2100 also displays an estimated amount of storage per tier per year 2110 at the start of each year as projected for a specific time period, in this case seven years. The cost summary table 2100 also displays a total amount of storage by year 2112 for all of the tiers during the specified time period. Similarly, the cost summary form 2100 may also display an estimated amount of storage for each tier by year 2114 at the end of the year. In the depicted embodiment, the cost summary form 2100 also displays a total technology refresh storage amount 2116 for each tier after adding new technology and removing old technology. Although not used in the depicted example, the cost summary form 2100 may also display a total amount of new remote/flashcopy storage for all tiers and a cumulative amount of remote/flashcopy storage for all tiers.

As depicted, the cost summary form 2100 for the BAU storage environment may also include a cumulative cost of all new storage 2118. Of course, numerous other variables, breakout costs, and storage variable definitions may be displayed in the summary in various embodiments.

FIG. 22 is a screenshot of one embodiment of a cost summary table 2200 for a target storage environment in accordance with the present invention. As depicted, the cost summary table 2200 for the target storage environment is similar to the cost summary table 2100 for the BAU storage environment except that it includes calculations and information associated with the target storage environment as opposed to the BAU storage environment.

In the depicted embodiment the cost summary table 2200 specifies the net new storage by year 2204, specifies the actual new storage by year 2206, and specifies the total cost of new disk storage 2208. As depicted, the cost summary table 2200 also displays an estimated amount of storage per tier per year 2210 at the start of each year as projected for a specific time period, in this case seven years. The cost summary table 2200 also displays a total amount of storage by year 2212 for all of the tiers during the specified time period. Similarly, the cost summary form 2200 may also display an estimated amount of storage for each tier by year 2214 at the end of the year. In the depicted embodiment, the cost summary form 2200 also displays a total technology refresh storage amount 2216 for each tier after adding new technology and removing old technology. Although not used in the depicted example, the cost summary form 2200 may also display a total amount of new remote/flashcopy storage for all tiers and a cumulative amount of remote/flashcopy storage for all tiers.

As depicted, the cost summary form 2200 for the target or NEW storage environment may also include a cumulative cost of all new storage 2218. Of course, numerous other variables, breakout costs, and storage variable definitions may be displayed in the summary in various embodiments.

Figure 23A:
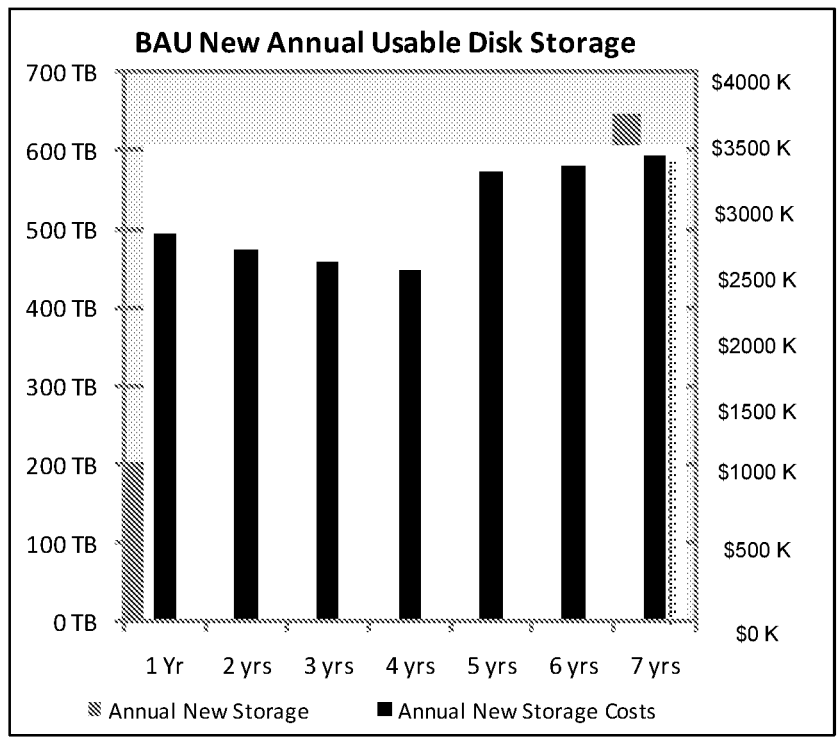
FIG. 23a is a screenshot of one embodiment of a comparison chart in accordance with the present invention.
Figure 23B:
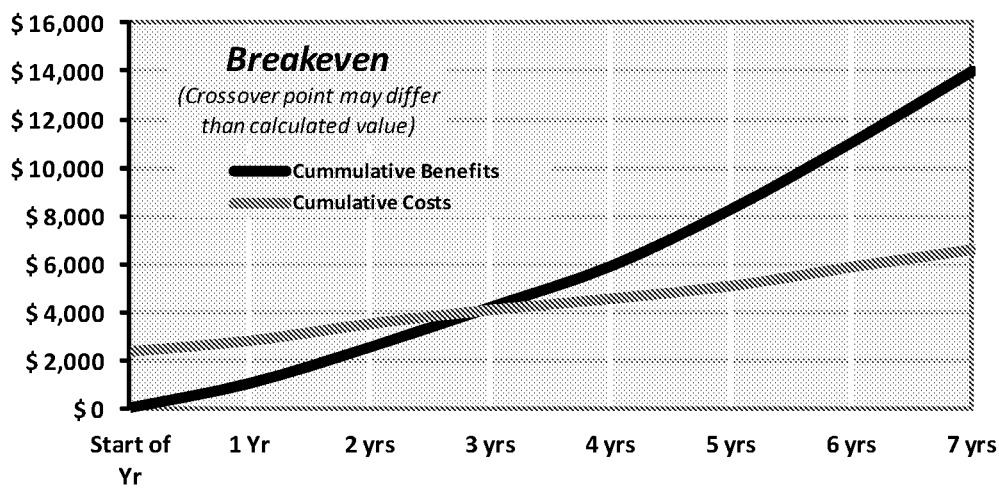
FIG. 23b is a screenshot of one embodiment of a line graph for analyzing and comparing storage environment costs in accordance with the present invention.

Once the cost module 206 determines the various costs associated with the first storage environment and the target storage environment, the comparison module 208 makes comparisons between the various costs of the different storage environments. For example, the comparison module 208 may generate data for a bar graph depicting cost comparisons by year for each system or in another embodiment may generate comparison data for a line graph to determine a breakeven point should the target storage environment replace the BAU storage environment. FIGS. 23a and 23b provide two examples of visual comparisons. Of course, numerous other types of comparisons including graphs, charts, tables, and the like are contemplated for use in accordance with the present invention. In one embodiment, the storage environment analysis tool 110 includes default settings that cause the tool to automatically generate particular graphs, tables, and charts associated with comparing the costs and benefits of the BAU storage environment with the target storage environment.

FIG. 23a is a screenshot of one embodiment of a comparison chart 2300a in accordance with the present invention. The comparison chart 2300a is a bar graph that compares the BAU storage environment with the target storage environment by year to create a visual depiction of the cost benefits and expenses associated with each environment over time.

FIG. 23b is a screenshot of one embodiment of a line graph 2300b for analyzing and comparing storage environment costs in accordance with the present invention. The line graph 2300b in the depicted example, demonstrates when a breakeven point would be reached should the target storage environment be adopted in place of the BAU storage environment. Such information helps a potential client, customer, or decision maker make an informed decision about making changes to or selecting an appropriate storage environment.

In other comparisons, additional data may be analyzed in breakout form included staffing costs, power costs, footprint costs, cash flow by year, and other variable cost elements as specified. The display module 210 may be used to display comparison results such as data, charts, graphs, and tables to user. In turn a user may integrate the data into a business plan or sales pitch as needed.

Figure 25:
FIG. 25 is a screenshot of one embodiment of a cost analysis table for a target storage environment in accordance with the present invention.

FIGS. 24 and 25 are a screenshots of one embodiment of cost analysis tables 2400 and 2500 for a first storage environment and target storage environment in accordance with the present invention. The cost analysis tables 2400 and 2500 provide a more detailed cost summary of the results of a cost analysis performed by the cost module 206. In the depicted embodiment, the cost analysis tables 2400 and 2500 include for each storage environment a total cost of new disk storage, total cost of new tape storage, licensing costs for tools such as SVC or TSPC, maintenance costs for those tools, new disk storage maintenance costs, data migration costs, power costs, facilities or footprint costs, staffing costs, a total of all costs for each environment, net annual storage capacity, net annual utilization, a cost per terabyte, and a cost per terabyte used. Of course, in other embodiments, additional cost variables may be included in cost analysis table. The data in this table may be used by the comparison module to create detailed comparisons of the storage environments and to analyze the cost and benefit of each environment.

FIG. 26 is a screenshot of one embodiment of a cost/benefit summary table 2600 for a target storage environment in accordance with the present invention. The summary table 2600 specifies the financial metrics used in the analysis, the net costs of the target storage environment, and the net benefits of the target storage environment.

In the depicted embodiment, the financial metrics include a 7 year analysis period, an internal discount rate of 10%, a return on investment of 75%, a net present value cash flow of $2,785 thousand, an internal rate of return of 40%, a modified internal rate of return of 27%, a benefit to cost ration of 1.7, and an approximate break-even point of 35 months. Also depicted are the licensing and maintenance fees associated with SVC and TSPC as well as the implementation costs and services, education costs, and total cost associated with the target storage environment. In the depicted embodiment, the net benefits summary monetizes the savings of disk storage, tape storage, disk maintenance, power/cooling, footprint (facilities occupancy), and the total benefits realized. Finally, the net benefit (total benefits–total costs) is provided. Of course, in various embodiments, different costs and variables may be included in the analysis and summary.

In this manner, the storage environment analysis tool 110 enables a user to input data regarding two complex storage environments, including multi-tier storage environments, and quickly determine and generate a visual representation of the costs and benefits associated with each environment. This enables a user to incorporate the information into a presentation, business plan, sales pitch, or the like, and enables a user to quickly change variables to determine a particular variable's effect on cost outcome.

In some embodiments, more detailed data inputs or outputs may be used. For example, in determining staffing costs, large worksheets may be used to precisely determine an accurate cost of employing a staff member to manage or maintain a storage environment. Similarly, detailed forms and worksheets may be used to determine a precise cost of power used by a storage environment or a footprint cost of a storage environment.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to analyze storage environment costs, the apparatus comprising:
   a processor;
   a memory in communication with the processor, the memory comprising:
   a first input module that receives as input first storage environment data corresponding to a first storage environment, the first storage environment data comprising one or more variables associated with a cost of implementing and operating the first storage environment;
   a second input module that receives as input target storage environment data corresponding to a target storage environment, the target storage environment data comprising one or more variables associated with a cost of implementing and operating the target storage environment, wherein the first storage environment and the target storage environment are multi-tier storage environments and wherein the first storage environment data and target storage environment data comprise one or more variables associated with a cost of implementing a multi-tier storage environment;
   a cost module that determines a cost associated with implementing and operating the first storage environment based on the received first storage environment data and that determines a cost associated with implementing and operating the target storage environment based on the received target storage environment data; and
   a comparison module that compares the determined cost of the first storage environment to the determined cost of the target storage environment; and
   a display module that displays results of the compared costs.

2. The apparatus of claim 1, wherein the first storage environment data comprises one or more storage-per-tier variables that define a total amount of storage per tier of the first storage environment.

3. The apparatus of claim 1, wherein the target storage environment data comprises one or more storage-per-tier variables that define a target amount of storage per tier for the target storage environment.

4. The apparatus of claim 2, wherein the first storage environment data further comprises one or more utilization variables that define an amount of utilization of storage for each tier of the first storage environment.

5. The apparatus of claim 1, wherein the first storage environment data comprises one or more data growth variables that define an anticipated amount of data growth over time.

6. The apparatus of claim 1, wherein the first storage environment data comprises one or more staffing variables that define a labor cost associated with implementing the first storage environment.

7. The apparatus of claim 1, wherein the first storage environment data comprises one or more footprint variables that define a cost associated with storing the components of the first storage environment.

8. The apparatus of claim 1, wherein the first storage environment data comprises one or more power variables that define an amount of power consumed by the first storage environment.

9. The apparatus of claim 1, wherein the target storage environment data comprises one or more target utilization variables that define an estimated target storage utilization for the target storage environment.

10. The apparatus of claim 1, wherein the target storage environment data comprises one or more reclamation variables that define an estimated reclamation of storage for the target storage environment as compared to the first storage environment.

11. The apparatus of claim 1, wherein the target storage environment data comprises one or more target component cost variables that define a cost associated with one or more of the software and hardware components of the target storage environment.

12. The apparatus of claim 1, wherein the target storage environment data comprises one or more target power variables that define an amount of power consumed by the target storage environment.

13. The apparatus of claim 1, wherein the display module displays one or more of storage by tier by year for the first storage environment and the second storage environment, cash flow by year for the first storage environment and the second storage environment, power consumption by year for the first storage environment and the second storage environment, and labor costs by year for the first storage environment and the second storage environment.

14. A system to analyze storage environment costs, the system comprising:
   a first storage environment comprising one or more non-transitory storage devices; and
   a storage environment analysis tool comprising
   a first input module that receives as input first storage environment data corresponding to the first storage environment, the first storage environment data comprising one or more variables associated with a cost of implementing and operating the first storage environment, a second input module that receives as input target storage environment data corresponding to a target storage environment, the target storage environment data comprising one or more variables associated with a cost of implementing and operating the target storage environment, wherein the first storage environment and the target storage environment are multi-tier storage environments and wherein the first storage environment data and target storage environment data comprise one or more variables associated with a cost of implementing a multi-tier storage environment;

a cost module that determines a cost associated with implementing and operating the first storage environment based on the received first storage environment data and that determines a cost associated with implementing and operating the target storage environment based on the received target storage environment data; and a comparison module that compares the determined cost of the first storage environment to the determined cost of the target storage environment; and a display module that displays results of the compared costs.

15. The system of claim 14, wherein the first storage environment data comprises one or more storage-per-tier variables that define a total amount of storage per tier of the first storage environment and wherein the target storage environment data comprises one or more storage-per-tier variables that define a target amount of storage per tier for the target storage environment.

16. A non-transitory computer readable storage medium having computer readable program code executing to perform operations for analyzing storage environment costs, the operations comprising:

receiving as input first storage environment data corresponding to a first storage environment, the first storage environment data comprising one or more variables associated with a cost of implementing and operating the first storage environment;

receiving as input target storage environment data corresponding to a target storage environment, the target storage environment data comprising one or more variables associated with a cost of implementing and operating the target storage environment, wherein the first storage environment and the target storage environment are multi-tier storage environments and wherein the first storage environment data and target storage environment data comprise one or more variables associated with a cost of implementing a multi-tier storage environment;

determining a cost associated with implementing and operating the first storage environment based on the received first storage environment data and determining a cost associated with implementing and operating the target storage environment based on the received target storage environment data;

comparing the determined cost of the first storage environment to the determined cost of the target storage environment; and displaying results of the compared costs.

17. The non-transitory computer readable storage medium of claim 16, wherein the first storage environment data comprises one or more storage-per-tier variables that define a total amount of storage per tier of the first storage environment, and wherein the target storage environment data comprises one or more storage-per-tier variables that define a target amount of storage per tier for the target storage environment.

18. A method for analyzing storage environment costs, the method comprising:

providing a first input module that receives as input first storage environment data corresponding to the first storage environment, the first storage environment data comprising one or more variables associated with a cost of implementing and operating the first storage environment;

providing a second input module that receives as input target storage environment data corresponding to a target storage environment, the target storage environment data comprising one or more variables associated with a cost of implementing and operating the target storage environment, wherein the first storage environment and the target storage environment are multi-tier storage environments and wherein the first storage environment data and target storage environment data comprise one or more variables associated with a cost of implementing a multi-tier storage environment;

providing a cost module that determines a cost associated with implementing and operating the first storage environment based on the received first storage environment data and that determines a cost associated with implementing and operating the target storage environment based on the received target storage environment data;

providing a comparison module that compares the determined cost of the first storage environment to the determined cost of the target storage environment;

providing a display module that displays results of the compared costs;

entering storage data information into the first and second input modules, the first and second modules operating on a processor;

applying the displayed results of the compared costs to a business plan; and presenting the business plan to a client.

* * * * *